US012566915B1

(12) United States Patent
Alvarez

(10) Patent No.: US 12,566,915 B1
(45) Date of Patent: Mar. 3, 2026

(54) SYSTEMS, METHODS, AND MEDIA FOR GENERATING AND DISPLAYING A VISUAL CONSTRUCT UTILIZED TO NAVIGATE TABULAR DATA AND THAT VISUALLY INDICATES LOCATIONS OF SEARCH RESULTS ACROSS THE TABULAR DATA

(71) Applicant: The MathWorks, Inc., Natick, MA (US)

(72) Inventor: Felix Alvarez, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 749 days.

(21) Appl. No.: 17/940,200

(22) Filed: Sep. 8, 2022

(51) Int. Cl.
| | |
|---|---|
| *G06F 17/00* | (2019.01) |
| *G06F 40/103* | (2020.01) |
| *G06F 40/177* | (2020.01) |

(52) U.S. Cl.
CPC .......... G06F 40/177 (2020.01); G06F 40/103 (2020.01)

(58) Field of Classification Search
CPC .............................. G06F 40/177; G06F 40/103
See application file for complete search history.

(56) References Cited

U.S. PATENT DOCUMENTS

| | | | | | |
|---|---|---|---|---|---|
| 5,396,621 | A * | 3/1995 | MacGregor | ........... | G06F 40/177 |
| | | | | | 715/975 |
| 8,010,523 | B2 * | 8/2011 | Djabarov | ............ | G06F 16/3325 |
| | | | | | 707/706 |

| | | | | | |
|---|---|---|---|---|---|
| 8,151,213 | B2 * | 4/2012 | Weitzman | ............... | G06F 40/18 |
| | | | | | 715/810 |
| 8,204,950 | B2 * | 6/2012 | Alperin | ................. | G06F 16/957 |
| | | | | | 715/236 |
| 8,433,719 | B1 * | 4/2013 | Choc | ..................... | G06F 3/0482 |
| | | | | | 707/754 |
| 12,254,058 | B2 * | 3/2025 | Keslin | ................... | G06F 16/986 |
| 2006/0277167 | A1 * | 12/2006 | Gross | ................. | G06F 16/9538 |
| 2007/0239768 | A1 * | 10/2007 | Quinn-Jacobs | ....... | G06F 16/248 |
| | | | | | 707/999.102 |

(Continued)

OTHER PUBLICATIONS

Depas, Spencer, "Find Specific Words or Phrases in Websites on Chrome", Jul. 5, 2019, Gadgethacks.com, 7 pages (Year: 2019).*

(Continued)

*Primary Examiner* — Mohammed H Zuberi
(74) *Attorney, Agent, or Firm* — Cesari and McKenna, LLP; Omar M. Wadhwa

(57) ABSTRACT

Techniques generate and display a visual construct to navigate tabular data and visually understand search results across the tabular data. The visual construct may include a level with one or more markers. The level may represent the entirety of the tabular data. Each marker may represent a different portion of the tabular data and may be located at a particular location on the level with a visual attribute. The locations and the visual attributes of the markers provide a visual understanding regarding search hits and their distribution across the entirety of the tabular data. Each marker may be selected to navigate the tabular data. Based on the selection of a marker that represents a portion of the tabular data, an additional level may be generated with additional markers. The additional markers provide a visual understanding regarding search hits and their distribution across the portion of the tabular data.

23 Claims, 13 Drawing Sheets

(56) References Cited

U.S. PATENT DOCUMENTS

| | | | |
|---|---|---|---|
| 2007/0240050 A1* | 10/2007 | Quinn-Jacobs | G06F 16/95 707/E17.107 |
| 2009/0006939 A1* | 1/2009 | DeSpain | G06F 40/18 715/217 |
| 2009/0313537 A1* | 12/2009 | Fu | G06F 16/00 715/201 |
| 2011/0131481 A1* | 6/2011 | Vronay | G06F 40/177 715/781 |
| 2012/0060114 A1* | 3/2012 | Chung | H04N 21/47202 715/781 |
| 2013/0124555 A1* | 5/2013 | Duquene | G06Q 30/0603 707/769 |
| 2013/0132811 A1* | 5/2013 | Ludwig | G06F 40/103 715/212 |
| 2015/0212715 A1* | 7/2015 | Singhal | G06F 40/177 715/760 |
| 2020/0104403 A1* | 4/2020 | Agarwal | G06F 16/951 |

OTHER PUBLICATIONS

Superuser, "How to do a whole word search in Chrome's Find dialog", 2019, https://superuser.com/questions/1245265/how-to-do-a-whole-word-search-in-chromes-find-dialog, 2 pages (Year: 2019).*

Mathworks Matlab File Exchange "Data science predict damage costs of weather events" retrieved from [https://www.mathworks.com/matlabcentral/fileexchange/69337-data-science-predict-damage-costs-of-weather-events], updated May 21, 2021, downloaded on Oct. 5, 2022, 17 pages.

* cited by examiner

SYSTEMS, METHODS, AND MEDIA FOR GENERATING AND DISPLAYING A VISUAL CONSTRUCT UTILIZED TO NAVIGATE TABULAR DATA AND THAT VISUALLY INDICATES LOCATIONS OF SEARCH RESULTS ACROSS THE TABULAR DATA

BRIEF DESCRIPTION OF THE DRAWINGS

The description below refers to the accompanying drawings, of which.

DETAILED DESCRIPTION OF AN ILLUSTRATIVE EMBODIMENT

Figure 1A:
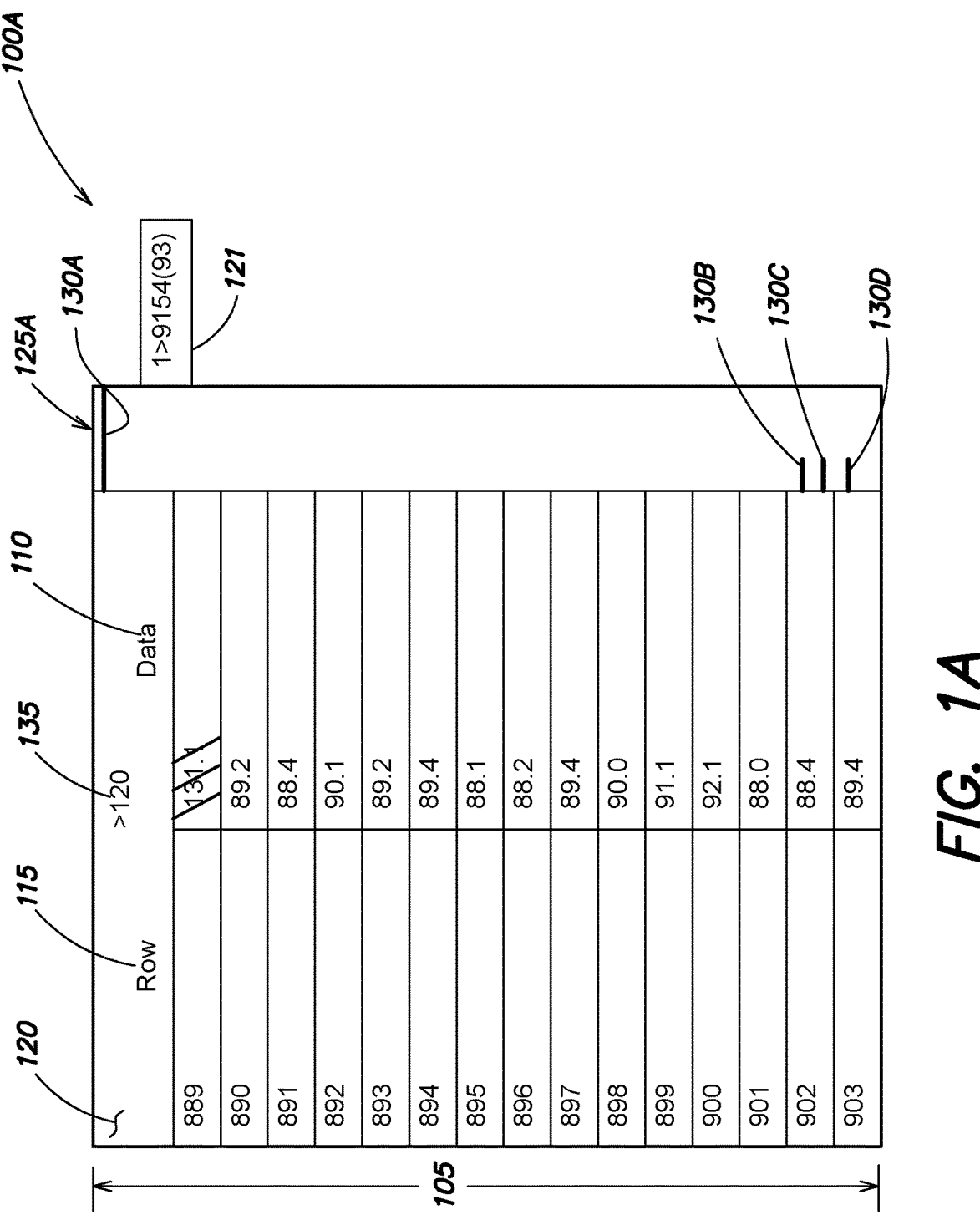
FIG. 1A is an example display screen that displays a portion of tabular data with a visual construct that visually indicates locations of search hits and their distribution across rows of the entirety of the tabular data according to the one or more embodiments described herein.

A table is an arrangement of information or data that is typically stored in one or more rows and/or one or more columns. For example, the tabular data may include, but is not limited to, numerical values, variables, text strings, or any of variety of different types of information or data. The tabular data can be referenced and identified utilizing data indicators. For example, such data indicators may include, but are not limited to, row identifiers, column identifiers, line numbers, etc., that provide an indication regarding a location of the data in the tabular data. In many instances, the tabular data may be or become large in size. For example, the tabular data may store thousands, or even millions of data entries. The large size of the tabular data may result in difficultly in navigating the tabular data and/or understanding the tabular data.

As an illustrative example, consider a temperature sensor that obtains a plurality of temperature readings at one or more different times. As known by those skilled in the art, a temperature sensor is an electronic device that measures the temperature of its environment and can be utilized in a variety of applications. For example, temperature sensors may be utilized for food processing, medical applications, petrochemical handling, automotive monitoring, biological research, consumer electronics, etc.

For this illustrative example, let it be assumed that a temperature sensor obtains 1,373,044 temperature readings at a plurality of different times. Additionally, let it be assumed that the temperature readings are stored in a table as tabular data. Specifically, the tabular data includes 1,373,044 rows and 1 column, where each row stores a different temperature reading. Further, assume that the tabular data is being utilized in an application executing on a computing device. For example, a user may be utilizing the application to work with, e.g., manipulate or modify, the tabular data.

In certain instances, a user working with such tabular data may want to search and identify those temperature readings that are determined to be invalid. For example, a user may implement a search query to identify temperature readings that are above a certain threshold value and are thus invalid. The identified invalid entries that are the result of the search query may be referred to as search hits. By identifying the invalid temperature readings, the user can use the application to modify the tabular data in different ways. However, the way in which the user may desire to modify the data may be based on understanding the locations of the invalid values and their distribution across the tabular data. For example, the user may simply remove the invalid values from the tabular data if it is determined that the invalid values are clustered over one or more specific time periods. Alternatively, the user may use an interpolation technique to fill in the invalid values with valid values if the invalid values are spread out randomly across the tabular data, i.e., not clustered.

Because of the large size of the tabular data (e.g., 1,373,044 rows), only a portion of the tabular data may fit within a viewport of a display screen. As known by those skilled in the art, a viewport is a user's visible area within a display screen. For example, if an application is open on the display screen, the viewport may correspond to the graphical user interface presented by the application. In this example, let it be assumed that based on a size of a viewport, a total of 15 rows of the 1,373,044 rows that make up the tabular data can be displayed in the viewport at any given time, although a different number of rows could be chosen for display. Because, for this example, only a total of 15 rows with temperature readings can be displayed to the user at any given time, the user only has visual access to the 15 temperature readings at the given time. That is, because of the large size of the tabular data and the size constraints of the viewport, the entirety of the tabular data cannot fit into the viewport and cannot be displayed to the user at one given time. As such, the viewport with the portion of the tabular data may not provide the user with the ability to navigate the tabular data without manually scrolling/manipulating the viewport to include 15 different temperate readings. Manually scrolling/manipulating the viewport can be time consuming and inefficient for the user when the tabular data is large in size when compared to the size constraints of the viewport. Additionally, the viewport does not provide the user with the ability to identify the locations of the search hits and their distribution across the entirety of the tabular data. Therefore, it may be desirable to navigate the tabular data without manually manipulating a viewport and also identify location of search hits and their distribution across the tabular data, such that a user can work with the tabular data in a meaningful way.

The one or more embodiments described herein overcome the above-described deficiencies by providing systems, methods, and media for generating and displaying a visual construct utilized to navigate tabular data and that visually indicates locations of search results across the tabular data. As referenced herein, a visual construct may be any visual representation of an object, item, element, component, graphical user interface or component thereof, etc., that can be generated for display on a display screen. As will be described in further detail below, the visual construct according to the one or more embodiments described herein may be generated based on a hierarchical data structure that is constructed based on a size, e.g., number of rows, of the tabular data and display characteristics, e.g., dimension(s), of the viewport in pixels.

FIG. 1A is an example display screen 100A that displays a portion of tabular data with visual construct 125A that visually indicates locations of search hits and their distribution across rows of the entirety of the tabular data according to the one or more embodiments described herein.

For the example of FIG. 1A, let it be assumed that the display screen 100A displays data associated with tabular data that includes 1,373,044 rows and 1 column of temperature readings as described above. The example as described herein for a table that includes temperature readings is for illustrative purposes only, and it is expressly contemplated that the one or more embodiments described herein may be utilized with any of a variety of different types of data that may be stored as a table with one or more rows and/or one or more columns.

Viewport 105 of FIG. 1A is a user's visible area within display screen 100A. Although the tabular data includes 1,373,044 rows, the viewport may be configured to only display 15 rows, e.g., rows 889 through 903, of the tabular data and their corresponding temperature readings. That is, because of the large size of the tabular data, e.g., 1,373,044 rows, and the size constraints of the viewport 105, viewport 105 can only display a portion (e.g., 15 rows) of the tabular data at one time. Although the viewport displays 15 rows in the example of FIG. 1A, it is expressly contemplated that the viewport may be manipulated to display less or more rows. As such, it is expressly contemplated that the one or more embodiments as described herein can be utilized with viewports of any shape and/or size.

The viewport 105 also displays section 120. Section 120 includes a column identifier 115 titled "Row" that indicates that the values below column identifier 115 are the rows of the portion of the tabular data that are displayed in the viewport 105. Section 120 also includes a column identifier 110 titled "Data" that indicates that the values below the column identifier 110 are the data values, e.g., temperature readings, of the portion of the tabular data that is displayed in the viewport 105.

Additionally, section 120 includes search criteria 135. In the example of FIG. 1A, the search criteria 135 indicates that the entirety of the tabular data has been searched for invalid temperature readings, which here are any values that are greater than 120 degrees Fahrenheit (e.g., >120). In an embodiment, any of a variety of different conventional search algorithms or techniques may be implemented to search the tabular data to identify one or more search hits. The search hits may be highlighted in the tabular data. For example, and as depicted in FIG. 1A, the single search hit of the portion of the tabular data that is displayed in viewport 105 is highlighted, which is indicated with diagonal lines.

A search of the tabular data for invalid values that are greater than 120 may result in a plurality of search hits. However, viewport 105, that only displays 15 rows of temperature readings, does not allow the user working with the tabular data to easily navigate the entirety of the tabular data based on the search hits. Additionally, the viewport 105 does not allow the user to visually identify locations of the search hits and their distribution across the entirety of the tabular data that cannot fit within a viewport 105.

Although the examples as described herein may be based on search hits related to values that are greater than 120, it is expressly contemplated that any of a variety of different search types may be utilized according to the one or more embodiments described herein. For example, such search types may include, but are not limited to, string searches (e.g., patrial matches, exact matches, case sensitive, case insensitive, regex), exact numeric value searches, ranges of value searches, outlier searches, missing value searches, negative value searches, value in subset searches, local minimum searches (e.g., if a value is oscillating is this the lowest value in the valley), local maximum searches (e.g., if a value is oscillating is this the largest value in the peak), etc.

According to the one or more embodiments described herein, the visual constructs 125A-125G of FIGS. 1A-1G, 3, and 4 provide for the navigation of the entirety of the tabular data based on the search hits and further visually indicate locations of the search hits and their distribution across the entirety of the tabular data that cannot fit within viewport 105. In an implementation, the visual construct module 210 of FIGS. 6 and 7 may generate and display the visual constructs 125A-125G of FIGS. 1A-1G, 3, and 4. In an embodiment, the visual construct module 210 may display the generated visual constructs 125A-125G adjacent to viewport 105 that displays the portion of the tabular data. As such, a user can utilize the portion of the tabular data, that is displayed in the viewport 105, with the adjacent visual constructs 125A-125G that can represent the entirety of the tabular data.

Referring to FIG. 1A, the visual construct 125A includes markers 130A-130D. As will be described in further detail below, markers 130A-130D may be selected to navigate the tabular data based on the search results. Additionally, the locations of the markers 130A-130D on visual construct 125A and the visual attributes, e.g., width, applied to the markers 130A-130D may provide a visual indication regarding the search results and their distribution across the tabular data that cannot fit within viewport 105.

In an embodiment, the visual construct 125A may represent the entirety of the tabular data when visual construct 125A is displayed on the display 100A. Specifically, the top of the visual construct 125A may correspond to the beginning (e.g., row 1) of the tabular data and the bottom of the visual construct 125A may correspond to the end (e.g., last row) of the tabular data. Similarly, the middle of the visual construct 125A may correspond to the middle of the tabular data. Thus, the locations along the visual construct 125A, moving from top to bottom, represent the corresponding locations of the tabular data moving from the beginning to the end of the tabular data. In an embodiment, the height of the visual construct 125A may substantially match the height of the viewport 105. In an embodiment, the height of the visual construct 125A may be less than or equal to the height of the viewport 105. For example, the top of the visual construct 125A may align with the top of the first row of data displayed in viewport 105. Therefore, in this example, the top of the visual construct may align with the top of row 889 included in viewport 105.

Although the visual construct 125A in FIG. 1A is depicted as being a rectangle, it is expressly contemplated that the visual construct (125A-125G) according to the one or more embodiments described herein may be of any shape and/or size, where the visual construct represents the tabular data. Moreover, and in an embodiment, the visual construct 125A may be borderless and the markers 130A-130D may be located next to the viewport 105 and a user may be provided a visual indication regarding the location of the search hits based on where the markers 130A-130D are located in relation to the overall size of the viewport 105.

Further, although the visual construct 125A is directly adjacent to viewport 105 in FIG. 1A, it is expressly contemplated that the viewport can be at any location on a computer display. As such, the size, shape, and/or location of the visual construct 125A as depicted in FIG. 1A is for illustrative purposes only.

With reference to FIG. 1A that is based on the tabular data that includes 1,373,044 rows and 1 column of temperature readings, the top of visual construct 125A may correspond to the first row of the tabular data while the bottom of visual construct 125A may correspond to row 1,373,044 of the tabular data. Stated another way, the visual construct 125A that substantially matches the viewport 105 in size is a miniature visual representation of the entire tabular data (e.g., 1,373,044 rows), all of which cannot fit within the viewport 105. In an embodiment, a user may move a cursor or other pointing device over the top of the visual construct 125A and/or the bottom of the visual construct 125A. In response, the visual construct module 210 may display a graphic or text indicating that the top of visual construct 125A represents row 1 of the tabular data and/or that the bottom of the visual construct represents row 1,373,044 of the tabular data.

Visual construct 125A may include markers 130A-130D. Each of markers 130A-130D may represent a different number of rows of the tabular data that includes 1,373,044 rows. For this example, let it be assumed that each of markers 130A-130D represents 9,154 different rows of the tabular data. Specifically, marker 130A represents rows 1 through 9,154 of the tabular data. Marker 130B represents rows 1,299,869 through 1,309,022 of the tabular data. Marker 130C represents rows 1,309,023 through 1,318,176 of the tabular data. Marker 130D represents rows 1,318,177 through 1,327,330 of the tabular data. The determination of which different rows of the tabular data are represented by which markers may be based on a size of the tabular data in rows and the display characteristics, e.g., dimension of viewport in pixels, as described below with reference to FIG. 2.

The location of markers 130A-130D and the visual attribute (e.g., width) applied to markers 130A-130D visually indicate locations of the search hits and their distribution across the tabular data that includes 1,373,044 rows of temperature readings. In an embodiment, the generation and display of a visual construct may be unaffected by the operation of the viewport 105. For example, a user may manipulate or adjust the viewport 105 to display 15 different temperature readings. The display of the visual construct 125A, including markers 130A-130D at their locations on the visual construct 125A and with their visual attributes, may not change when the user manipulates viewport 105. Alternatively, and as will be described in further detail below, the operation, e.g., selection of a marker, of the visual construct 125 may cause the viewport 105 to be automatically manipulated. Moreover, and as will be described in further detail below, the manipulation of the viewport 105 may cause a marker, e.g., markers 130A-130D, to be highlighted. Specifically, the rows displayed in the viewport 105 may cause the one or more marker representing the rows to be highlighted.

Referring to FIG. 1A, marker 130A is located at the top of the visual construct 125A. As explained above, the locations along the visual construct 125A correspond to the locations, e.g., rows, along the tabular data. For example, the top of visual construct 125A corresponds to the beginning rows of the tabular data while the bottom of visual construct 125A corresponds to the ending rows of the tabular data. Therefore, and because marker 130A is located at the top of the visual construct 125A, marker 130A provides a visual indication that there are search hits in the beginning rows of the tabular data. Specifically, marker 130A provides a visual indication that there are search hits in rows (e.g., rows 1 through 9,154) of the tabular data that are represented by marker 130A. Markers 130B, 130C, and 130D are in close proximity to each other at the bottom of the visual construct 125A. As such, markers 130B, 130C, and 130D together provide a visual indication that there is a cluster of search hits in the ending rows of the tabular data. Specifically, markers 130B-130D provide a visual indication that there are search hits in the cluster of ending rows of the tabular data that are represented by markers 130B-130D.

Even more, the visual construct 125A provides a visual indication that there are no search hits, or an insignificant number of search hits, in the middle of the tabular data since there are no markers in the middle of the visual construct 125A. In an embodiment, an insignificant number of search hits may be determined utilizing the greatest number of search hits in the rows that are represented by a marker on visual construct 125A. In the example of FIG. 1A, let it be assumed that the rows represented by marker 130A include 93 search hits which is the greatest number of search hits when compared to the other search hits in the rows that are represented by the other markers on visual construct 125A. That is, the rows of the tabular data that are represented by marker 130A include more search hits than the rows of the tabular data that are represented by markers 130B-130D.

The visual construct module 210 may determine that if the rows represented by a particular marker include a number of search hits that is less than 5% of 93 search hits, then the rows represented by the particular marker include an insignificant number of search hits and the particular marker should not be displayed on visual construct 125A. Because 5% of 93 is 4.65, the visual construct module 210 determines that if the rows that are represented by the particular marker include more than 0 search hits and less than 5 search hits, the particular marker representing the rows is not to be displayed on visual construct 125A. Alternatively, and in an embodiment, the visual construct module 210 may display the particular marker with a particular visual attribute to indicate that the rows represented by the particular marker include an insignificant number of search hits.

For example, the particular marker may have a minimum width and/or a particular highlighting, opacity, or color to indicate that the rows of the tabular data represented by the particular marker include an insignificant number of search hits.

In an embodiment, the number of search hits that is determined to be an insignificant number of search hits may be configured by a user utilizing, for example, a computing device according to the one or embodiments described herein. For example, the visual construct module 210 may utilize a cutoff number provided by the user to then determine if the rows represented by a marker includes an insignificant number of search hits.

Accordingly, and in the example of FIG. 1A, the visual construct 125A visually indicates that there are no search hits, or an insignificant number of search hits, at the locations where there are no markers on the visual construct 125A.

Therefore, the locations of the markers 130A-130D on the visual construct 125A provide a visual indication that the search hits, e.g., temperature readings that are greater than 120, are distributed in the beginning rows of the tabular data and clustered in ending rows of the tabular data.

In addition to the locations of markers 130A-130D providing visual indications regarding search hits and their distribution in the tabular data, the visual attributes applied to markers 130A-130D may also provide visual indications regarding the search hits and their distribution in the tabular data. Specifically, the visual attributes provided to the markers 130A-130D may provide a visual indication regarding the number of search hits in the rows of the tabular data that are represented by the markers 130A-130D.

For example, marker 130A is wider than each of markers 130B-130D that are all approximately the same width. Accordingly, the visual construct 125A provides a visual indication that the rows of the tabular data that are represented by marker 130A include more search hits than the rows of the tabular data that are represented by markers 130B-130D. Additionally, and because of each of markers 130B-130D are substantially the same width, the visual construct 125A provides a visual indication that the rows of the tabular data that are represented by markers 130B-130D have a similar number of search hits. Further, because markers 130B-130D are approximately ¼ the width of marker 130A, the visual attributes provide a visual indication that the rows represented by markers 130B-130D include approximately ¼ the number of search hits that are included in the rows represented by marker 130A. The visual attributes may be applied to markers 130A-130D utilizing a total number of search hits in the rows represented by the markers 130A-130D as described in further detail below with reference to the hierarchical structure of FIG. 2.

Therefore, the locations of the markers 130A-130D on the visual construct 125A and the visual attributes applied to the markers 130A-130D together can visually indicate locations of the search hits and their distribution across the entirety of the tabular data that includes 1,373,044 rows, the entirety of which cannot fit within viewport 105.

Specifically, marker 130A is at the top of the visual construct 125 and wider than each of the other markers 130B-130D that are located at the bottom of the visual construct 125A. As such, the visual construct 125A visually indicates that the beginning rows of the tabular data that are represented by marker 130A include more, e.g., approximately 4 times more, search hits than the ending rows of the tabular data that are represented by markers 130B-130D. Further, and because markers 130B-130D are in close proximity to each other and are substantially the same width, the visual construct 125A provides a visual indication that there is a cluster of search hits in ending rows of the tabular data that are represented by markers 130B-130D, and that the rows represented by each of markers 130B-130D have a similar number of search hits.

Moreover, the lack of markers at particular locations on the visual construct 125A provides a visual indication that the rows of the tabular data that correspond to the particular locations include no search hits or an insignificant number of search hits.

In an embodiment, the visual construct module 210 may generate and display information related to markers 130A-130D in response to user input. For example, a user may move a cursor or pointing device over any of markers 130A-130D or provide any other type of input command with relation to the markers 130A-130D. In response, the visual construct module 210 may generate and display (1) information indicating the rows of the tabular data that are represented by the marker, and/or (2) the number of search hits in the rows of the tabular data that are represented by the marker.

For the example of FIG. 1A, let it be assumed the user has moved a cursor over marker 130A. Based on the cursor moving within a threshold distance of marker 130A, the visual construct module 120 may display a graphic or text 121 indicating that marker 130A represents rows 1 through 9,154 of the tabular data that includes 1,373,044 rows, and that there are a total of 93 search hits in rows 1 through 9,154. If the user moves the cursor over a different marker, the visual construct module 210 may display a graphic or text indicating the 9,154 rows of the tabular data that are represented by the different marker and the number of search hits in the rows represented by the different marker.

For example, if the cursor is moved over marker 130B, the visual construct module 210 may display a graphic or text (not shown) indicating that marker 130B represents rows 1,299,869 through 1,309,022 of the tabular data, and that there are a total of 23 search hits in rows 1,299,869 through 1,309,022. If the cursor is moved over marker 130C, the visual construct module 210 may display a graphic or text (not shown) indicating that the marker 130C represents rows 1,309,023 through 1,318,176 of the tabular data, and that there are a total of 21 search hits in rows 1,309,023 through 1,318,176. If the cursor is moved over marker 130D, the visual construct module 210 may display a graphic or text (not shown) indicating that the marker 130D represents rows 1,318,177 through 1,327,330 of the tabular data, and that there are a total of 18 search hits in rows 1,318,177 through 1,327,330.

Advantageously, even though only 15 rows of the tabular data can be displayed in viewport 105, the adjacent visual construct 125A can visually indicate locations of the search results for the entirety of the tabular data that includes 1,373,044 rows. For example, the user may utilize the visual construct 125A and markers 130A-130D to determine that the invalid temperature readings, i.e., search hits, are clustered at the beginning (based on marker 130A) and end (based on markers 130B-130D) of the tabular data such that the invalid temperature readings can be removed, i.e., "clipped", from the tabular data. However, if the visual construct 125A had included markers 130 that are evenly distributed across the entire visual construct 125A (not shown), the user may determine that an interpolation technique should be implemented instead of clipping. As such, a user can work with tabular data in a meaningful way based on the visual indications provided by the visual construct 125A according to the one or more embodiments described herein.

In an embodiment, the visual construct module 210 may generate and display an additional level of a visual construct based on, for example, a selection of a particular marker of markers 130A-130D of the visual construct 125A. As will be described in further detail below, the viewport 105 may be automatically manipulated by visual construct module 210 to display particular rows of the tabular data corresponding to a selected marker, e.g., 130A-130D, on visual construct 125A. Additionally, and as will be described in further detail below, the manipulation of the viewport 105 may cause different markers, corresponding to the rows of the tabular data in the viewport 105, to be highlighted.

Figure 1B:
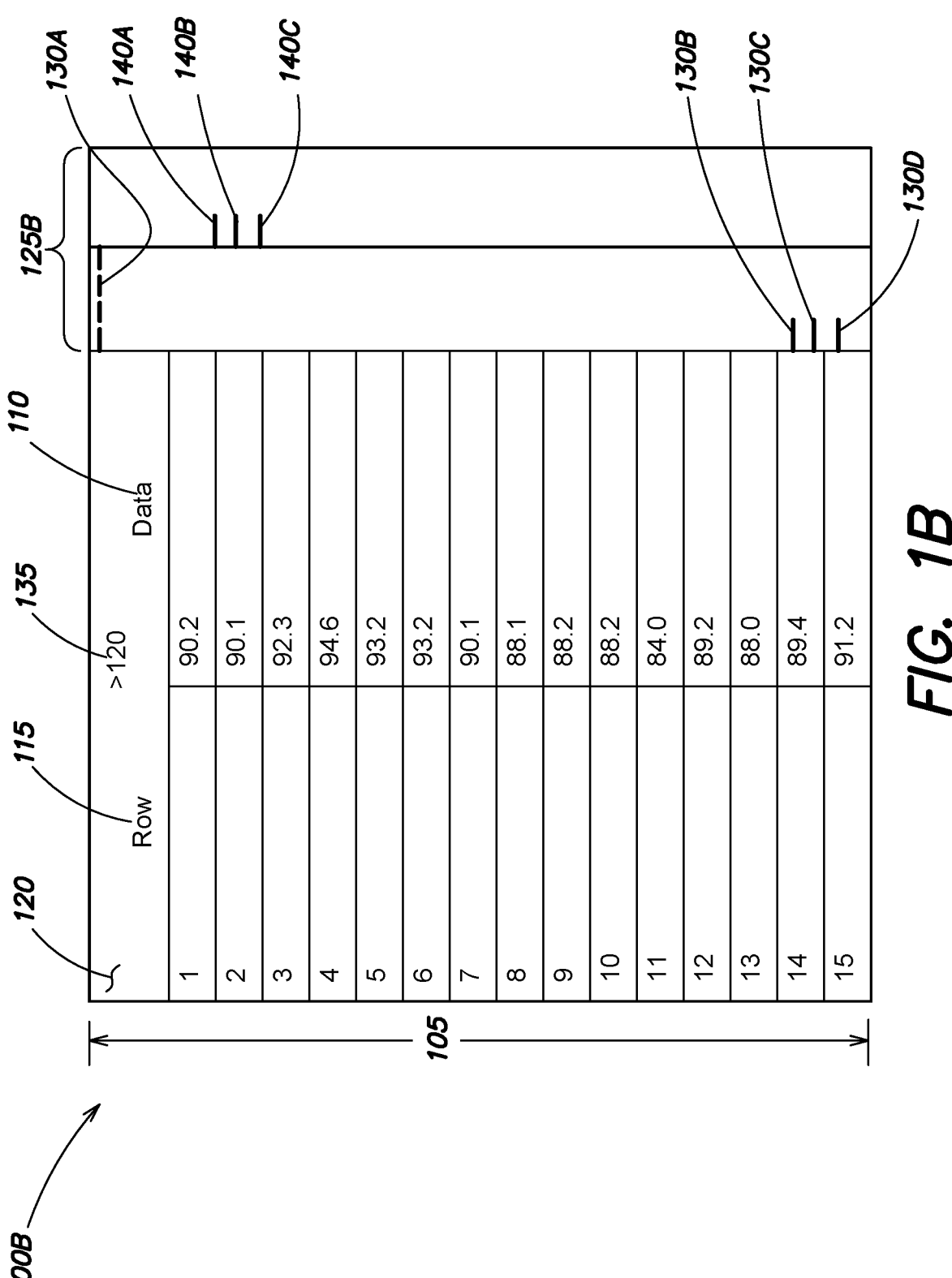
FIG. 1B is another example display screen that displays a portion of tabular data with a visual construct that includes an additional level based on the selection of a marker from the visual construct of FIG. 1A according to the one or more embodiments described herein.

FIG. 1B is another example display screen 100B that displays a portion of tabular data with a visual construct 125B that includes an additional level based on the selection of marker 130A according to the one or more embodiments described herein.

The visual construct 125B includes two levels. One level, i.e., the left column of visual construct 125B, includes markers 130A-130D that are included in visual construct 125A of FIG. 1A. As explained above, markers 130A-130D visually indicate locations of the search hits and their distribution across the entirety of the tabular data. The visual construct 125B also includes an additional level, i.e., the right column of visual construct 125B, with markers 140A-140C. The additional level with markers 140A-140C may be generated and displayed by the visual construct module 210 based on the selection of marker 130A. Marker 130A is highlighted in FIG. 1B utilizing a dashed line to indicate that marker 130A is selected. As described herein, the term level and the term column may be used interchangeably for the visual constructs 125A-125G of FIGS. 1A-1G, 3, and 4.

Because the additional level is generated based on the selection of marker 130A, the additional level of the visual construct 125B, e.g., right column of visual construct 125B, represents the rows of the tabular data that are represented by marker 130A. Specifically, and as explained above, marker 130A represents rows 1 through 9,154 of the tabular data. As such, the top of the additional level (right column) of the visual construct 125B corresponds to row 1 of the tabular data while the bottom of the additional level of the visual construct 125B corresponds to row 9,154 of the tabular data. Therefore, the additional level of the visual construct 125B is a miniature version of rows 1 through 9,154 of the tabular data that cannot fit in the viewport 105.

In an embodiment, a user may move a cursor or other pointing device over the top of the left column of the visual construct 125B and/or the bottom of the left column of visual construct 125B. In response, the visual construct module 210 may display a graphic or text indicating that the top of the left column of visual construct 125B represents row 1 of the tabular data and/or that the bottom of the left column of the visual construct 125B represents row 1,373, 044 of the tabular data. In addition or alternatively, a user may move a cursor or other pointing device over the top of the right column of the visual construct 125B and/or the bottom of the right column of the visual construct 125B. In response, the visual construct module 210 may display a graphic or text indicating that the top of the right column of the visual construct 125B represents row 1 of the tabular data and/or that the bottom of the right column of the visual construct represents row 9,154 of the tabular data.

The additional level that represents rows 1 through 9,154 of the tabular data includes markers 140A-140C. In this example, let it be assumed that each marker represents 62 different rows of rows 1 through 9,154 of the tabular data. For example, marker 140A may represent rows 2,171 through 2,232 of the tabular data, marker 140B may represent rows 2,233 through 2,294 of the tabular data, and marker 140C may represent rows 2,295 through 2,356 of the tabular data.

In a similar manner as described above with reference to FIG. 1A, the locations of markers 140A-140C and the visual attributes applied to markers 140A-140C visually indicate locations of the search hits and their distribution across the tabular data. However, because the additional level of the visual construct 125B represents rows 1 through 9,154 of the tabular data, the locations and visual attributes applied to markers 140A-140C visually indicate locations of the search hits and their distribution across rows 1 through 9,154 of the tabular data. That is, markers 130A-130D of the visual construct 125B visually indicate locations of the search hits and their distribution across the entirety of the tabular data that includes 1,373,044 rows, while markers 140A-140C of the additional level of the visual construct 125B visually indicate locations of the search hits and their distribution across rows 1 through 9,154 of the tabular data. Markers 140A-140C are clustered at a location that is approximately the halfway point between the top and middle of the additional level of the visual construct 125B. Stated another way, markers 140A-140C are clustered a quarter distance down from the top of the additional level of the visual construct 125B. Because the additional level visual construct 125B represents a total of 9,154 rows, e.g., rows 1 through 9,154, the quarter point on the additional level of the visual construct 125B corresponds to the approximate quarter point between row 1 and row 9,154 of the tabular data.

As such, the locations of markers 140A-140C visually indicate that there is a cluster of search hits at around row 2288 (row 2288 is approximately the quarter value between rows 1 and 9,154) of the tabular data. Additionally, the markers 140A-140C are all approximately a same width. As such, the visual attributes, e.g., substantially equal widths, applied to markers 140A-140C visually indicate that the rows represented by markers 140A-140C include a similar amount of search hits. Moreover, the lack of markers at particular locations on the additional level of visual construct 125B visually indicate that the rows of the tabular data that correspond to the particular locations include no search hits or an insignificant number of search hits.

Therefore, markers 130A-130D of visual construct 125B visually indicate locations of the search hits and their distribution across the entirety of the tabular data. Based on the visual indications, a user may select marker 130A to navigate to the portion of the tabular data that is represented by marker 130A and that may be of interest. Based on the selection, the additional level with markers 140A-140C of visual construct 125B may be generated as depicted in FIG. 1B, and markers 140A-140C may visually indicate locations of the search hits and their distribution across the portion (e.g., rows 1 through 9,154) of the tabular data.

As depicted in FIG. 1B, and based on the selection of marker 130A, the visual construct module 210 may adjust/manipulate the viewport 105 such that one or more rows of the tabular data that are represented by marker 130A are automatically displayed in viewport 105. Marker 130A represents rows 1 through 9,154 of the tabular data.

Therefore, and based on the selection of marker 130A, the viewport 105 may be automatically adjusted to display 15 rows of the tabular data that are within the range of rows 1 through 9,154. As depicted in FIG. 1B, visual construct module 210 automatically adjusts viewport 105 to display rows 1 through 15 of the tabular data that are the first 15 rows that are within the range of rows 1 through 9,154 that are represented by selected marker 130A.

In an implementation, the visual construct module 210 may utilize any of a variety of different techniques or algorithms to determine which 15 rows of rows 1 through 9,154 of the tabular data are automatically displayed in viewport 105 when marker 130A is selected. For example, the visual construct module 210 may automatically adjust the viewport 105 to display the rows of the tabular data that are within the range of rows represented by the selected marker and that also include one or more search hits. As an illustrative example, let it be assumed that the first search hit in rows 1 through 9,154 of the tabular data is in row 21. Accordingly, the viewport 105 may be automatically adjusted (not shown) to display rows 21 through 35 of the tabular data based on the selection of marker 130A. Advantageously, and according to the one or more embodiments described herein, the user can navigate the tabular data utilizing the visual construct 125B and, specifically, selecting a particular marker from the visual construct 125B.

Additionally, the user may navigate the tabular data in the viewport 105 to, for example, identify one or more rows of the tabular data that are of interest to the user. In an embodiment, the user may utilize an input device to navigate the tabular data in the viewport 105. For example, a vertical scroll bar (not shown) may be part of the viewport 105 or adjacent to the viewport 105. The user may utilize a mouse to select a scroll arrow or a thumb of the vertical scroll bar (not shown) to navigate the tabular data in the viewport 105. Alternatively, the tabular data in the viewport 105 may be navigated utilizing any of a variety of different ways as known by those skilled in the art.

Figure 1C:
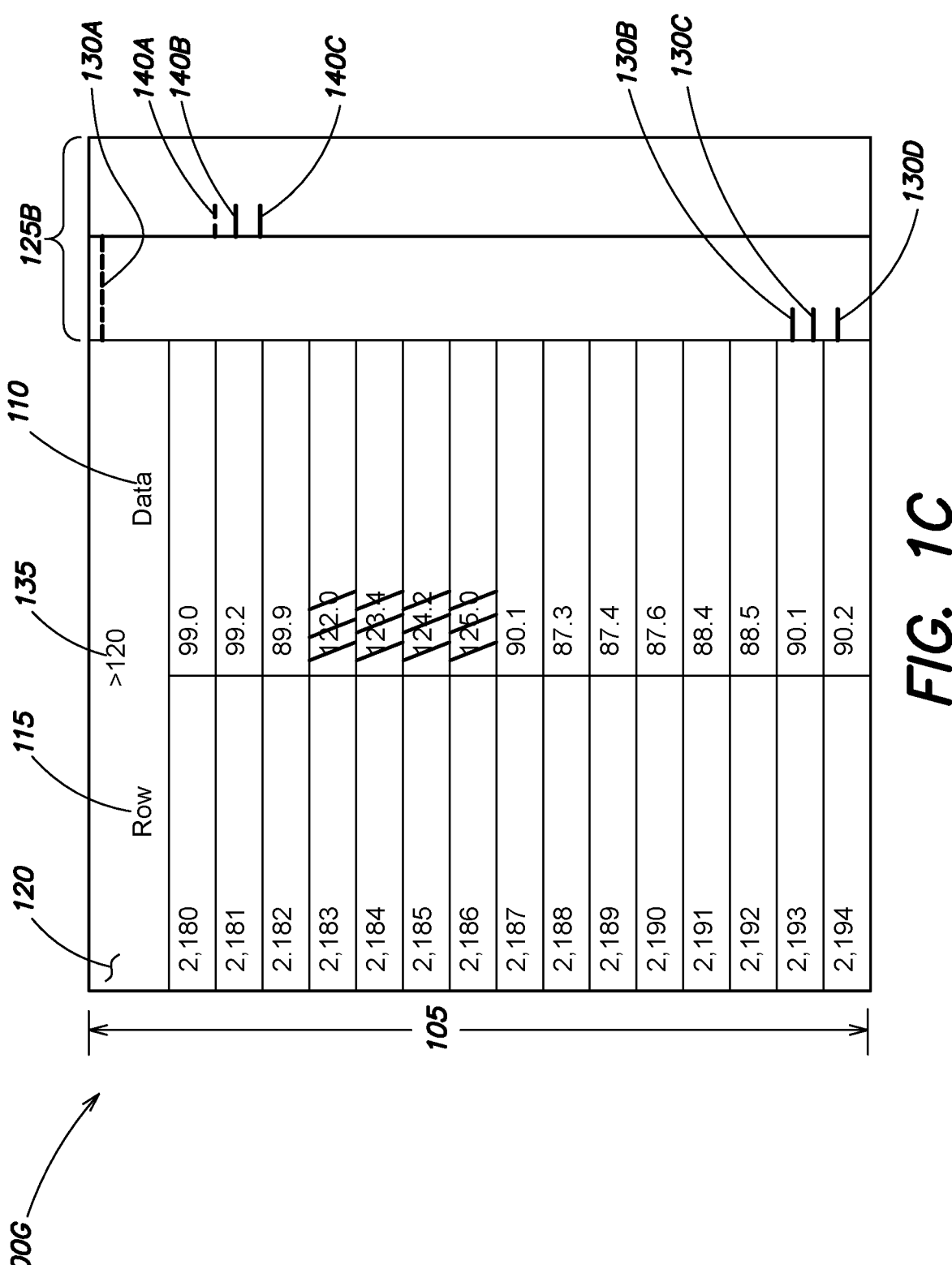
FIGS. 1C and 1D are example display screens that display the visual construct of FIG. 1B with highlighted markers based on a manipulation of the data in a viewport according to the one or more embodiments described herein.
Figure 1D:
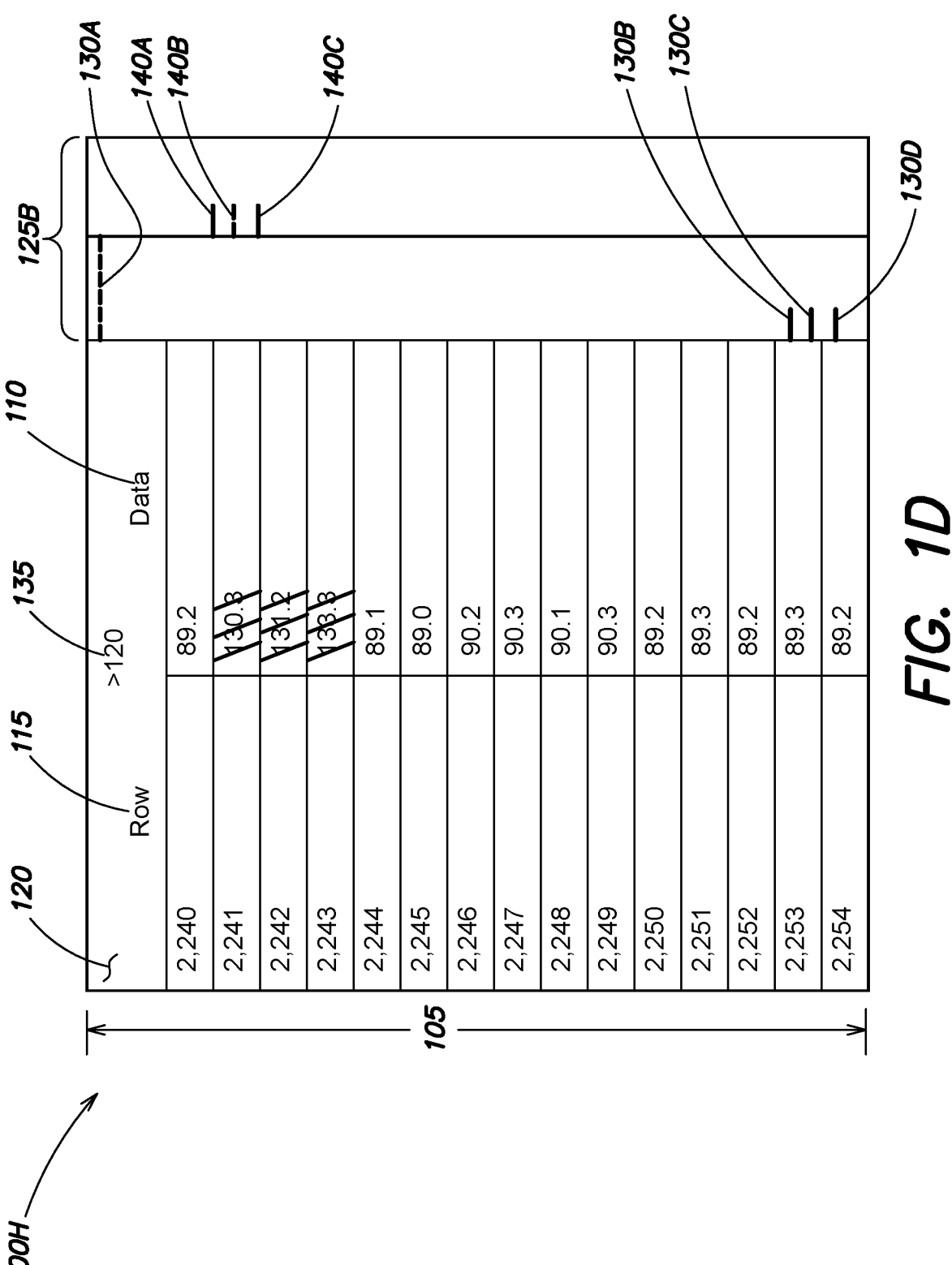
Figure 1E:
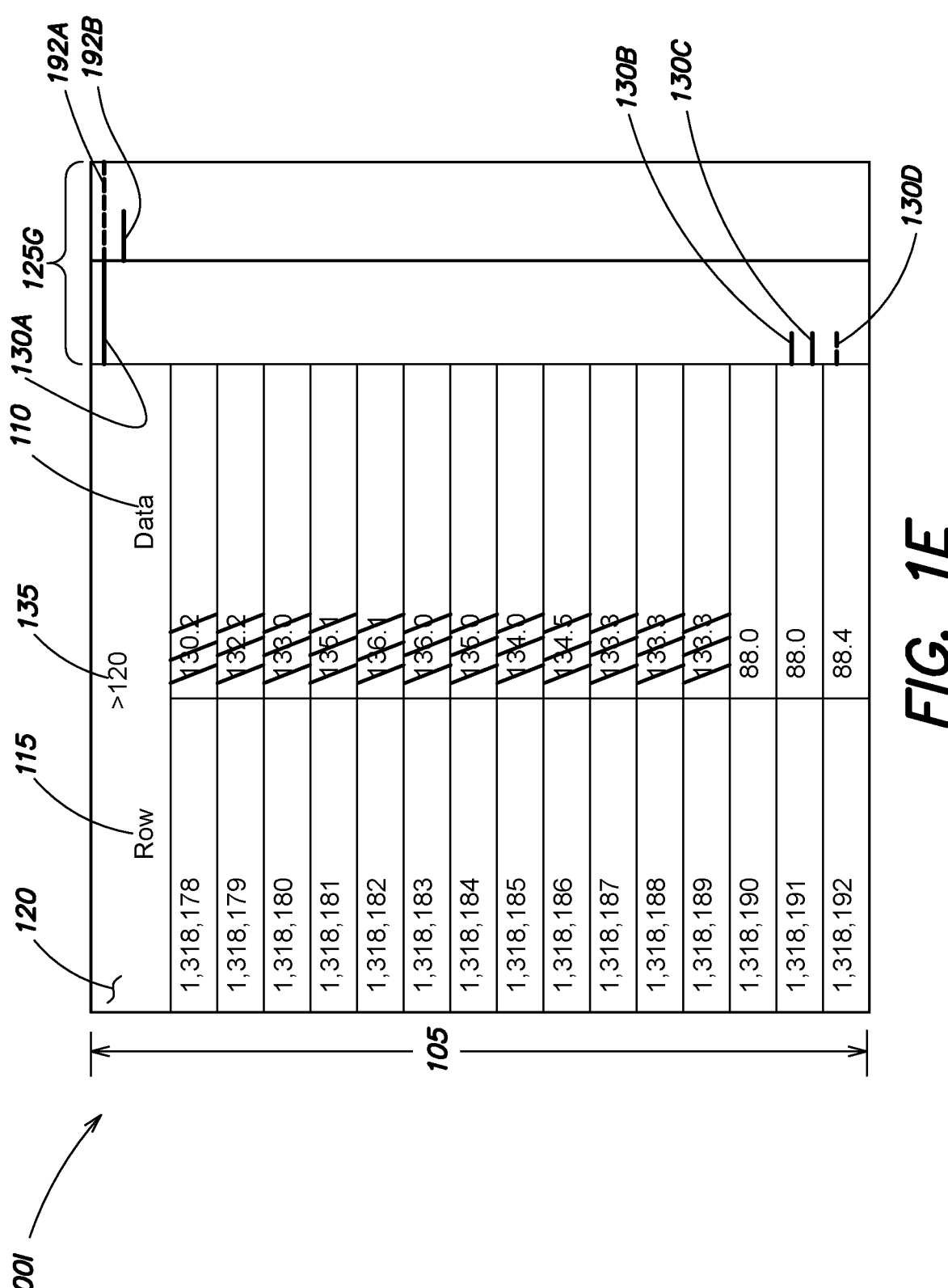
FIG. 1E is an example display screen that displays a different visual construct with highlighted markers based on a different manipulation of the data in a viewport according to the one or more embodiments described herein.

In an implementation, the navigation of the data in the viewport 105, i.e., the manipulation of the viewport 105, may cause different markers of the visual construct 125B to be highlighted. FIGS. 1C-1E are example display screens 100G, 100H, and 100I that display visual constructs, e.g., visual constructs 125B and 125G, with highlighted markers based on the manipulation of the data in viewport 105 according to the one or more embodiments described herein.

In the example of FIG. 1C, the user has manipulated viewport 105 to display rows 2,180 through 2,194 of the tabular data that include 4 search hits. As indicated above, marker 140A may represent rows 2,171 through 2,232 of the tabular data. Rows 2,180 through 2,194, that are displayed in the viewport 105 based on user manipulation of viewport 105, are within the range of rows 1 through 9,154 of the tabular data that are represented by marker 130A. As such, the visual construct module 210 may highlight marker 130A on visual construct 125B as depicted in FIG. 1C. Rows 2,180 through 2,194 are not within the range of rows of the tabular data that are represented by markers 130B-130D. As such, markers 130B-130D are not highlighted on visual construct 125B of FIG. 1C. Rows 2,180 through 2,194 are also within the range of rows 2,171 through 2,232 of the tabular data that are represented by marker 140A. As such, the visual construct module 210 may highlight marker 140A on visual construct 125B as depicted in FIG. 1C. Rows 2,180 through 2,194 are not within the range of rows of the tabular data that are represented by markers 140B and 140C. As such, markers 140B and 140C are not highlighted on visual construct 125B of FIG. 1C. Accordingly, and based on the manipulation of viewport 105 to display rows 2,180 through 2,194, the visual construct module 210 can automatically highlight markers 130A and 140A on visual construct 125B as depicted in FIG. 1C.

If the user further manipulates the viewport 105 to display different rows of the tabular data, different markers may be automatically highlighted by the visual construct module 210. In the example of FIG. 1D, the user has further manipulated viewport 105 to display rows 2,240 through 2,254 of the tabular data that include 3 search hits. As indicated above, marker 140B may represent rows 2,233 through 2,294 of the tabular data. Rows 2,240 through 2,254, that are displayed in viewport 105 based on user manipulation of the viewport 105, are within the range of rows 1 through 9,154 of the tabular data that are represented by marker 130A. As such, the visual construct module 210 may highlight marker 130A on visual construct 125B as depicted in FIG. 1D. Rows 2,240 through 2,254 are not within the range of rows of the tabular data that are represented by markers 130B-130D. As such, markers 130B-130D are not highlighted on visual construct 125B of FIG. 1D. Rows 2,240 through 2,254 are also within the range of rows 2,233 through 2,294 of the tabular data that are represented by marker 140B. As such, the visual construct module 210 may highlight marker 140B on visual construct 125B as depicted in FIG. 1D. Rows 2,240 through 2,254 are not within the range of rows of the tabular data that are represented by markers 140A and 140C. As such, markers 140A and 140C are not highlighted on visual construct 125B of FIG. 1D. Accordingly, and based on the manipulation of viewport 105 to display rows 2,240 through 2,254, the visual construct module 210 can automatically highlight markers 130A and 140B as depicted in FIG. 1D.

As another example, consider the user manipulating viewport 105 to display rows 1,318,178 through 1,318,192 of the tabular data as depicted in FIG. 1E. As indicated above, marker 130D may represent rows 1,318,177 through 1,327, 330 of the tabular data. Because viewport 105 displays rows 1,318,178 through 1,318,192 with 12 search hits, the visual construct module 210 may generate visual construct 125G of FIG. 1E with highlighted markers. Specifically, rows 1,318, 178 through 1,318,192 that are displayed in the viewport 105, based on user manipulation of the viewport 105, are within the range of rows 1,318,177 through 1,327,330 of the tabular data that are represented by marker 130D. As such, the visual construct module 210 may highlight marker 130D on visual construct 125G as depicted in FIG. 1E. Rows 1,318,178 through 1,318,192 are not within the range of rows of the tabular data that are represented by markers 130A-130C. As such, markers 130A-130C are not highlighted on visual construct 125G of FIG. 1E.

In this example, let it be assumed that marker 192A represents rows 1,318,177 through 1,318,238 of the tabular data. Further, let it be assumed that marker 192B represents rows 1,318,239 through 1,318,300 of the tabular data. Rows 1,318,178 through 1,318,192, that are displayed in viewport 105 based on user manipulation of viewport 105, are within the range of rows 1,318,177 through 1,318,238 of the tabular data that are represented by marker 192A. Therefore, the visual construct module 210 may highlight marker 192A on visual construct 125G as depicted in FIG. 1E. Rows 1,318, 178 through 1,318,192, that are displayed in viewport 105 based on user manipulation of viewport 105, are not within the range of rows 1,318,239 through 1,318,300 of the tabular data that are represented by marker 192B. As such, the visual construct module 210 does not highlight marker 192B on visual construct 125G of FIG. 1E. If the user, for example, further manipulated viewport 105 to display rows 1,318,238 through 1,318,252 of the tabular data that are represented by marker 192B, the visual construct module 210 may automatically unhighlight marker 192A and highlight marker 192B.

Therefore, a user can navigate the tabular data in viewport 105 such that one or more corresponding markers at one or more different levels of a visual construct are automatically highlighted. Advantageously, the user can navigate the tabular data in the viewport 105 and simultaneously see the search hits and their distribution across the tabular data based on the automatic highlighting of the markers according to the one or more embodiments described herein.

In an alternative embodiment, a user may manipulate the viewport 105 to view any 15 rows of the tabular data without the manipulation affecting the visual construct. For example, rows 1,318,178 through 1,3181,192 are displayed in viewport 105 as depicted in FIG. 1E. Let it be assumed that the user manipulates viewport 105 to display rows 1 through 15 of the tabular data. Even though the viewport 105 is manipulated to change the rows displayed in viewport 105, the visual construct module 210 may continue to display visual construct 125G of FIG. 1E instead of displaying visual construct 125B of FIG. 1B. Specifically, even though viewport 105 is manipulated to display rows 1 through 15 of the tabular data, markers 130A-130D and markers 192A-192B still remain displayed at their same locations and with the same visual attributes on the left and right columns of visual construct 125G. Advantageously, and in this alternative embodiment, the visual construct 125G with markers 130A-130D and markers 192A-192B provide a visual indication regarding the location of search hits and their distribution across the tabular data regardless of what rows the user desires to display in viewport 105.

In an embodiment, and as described above with reference to FIG. 1A, the visual construct module 210 may generate and display information indicating the rows of the tabular data that are represented by marker 140A-140C, and/or the number of search hits in the rows of the tabular data that are represented by the marker 140A-140C, similar to graphic or text 121 in FIG. 1A.

Figure 1F:
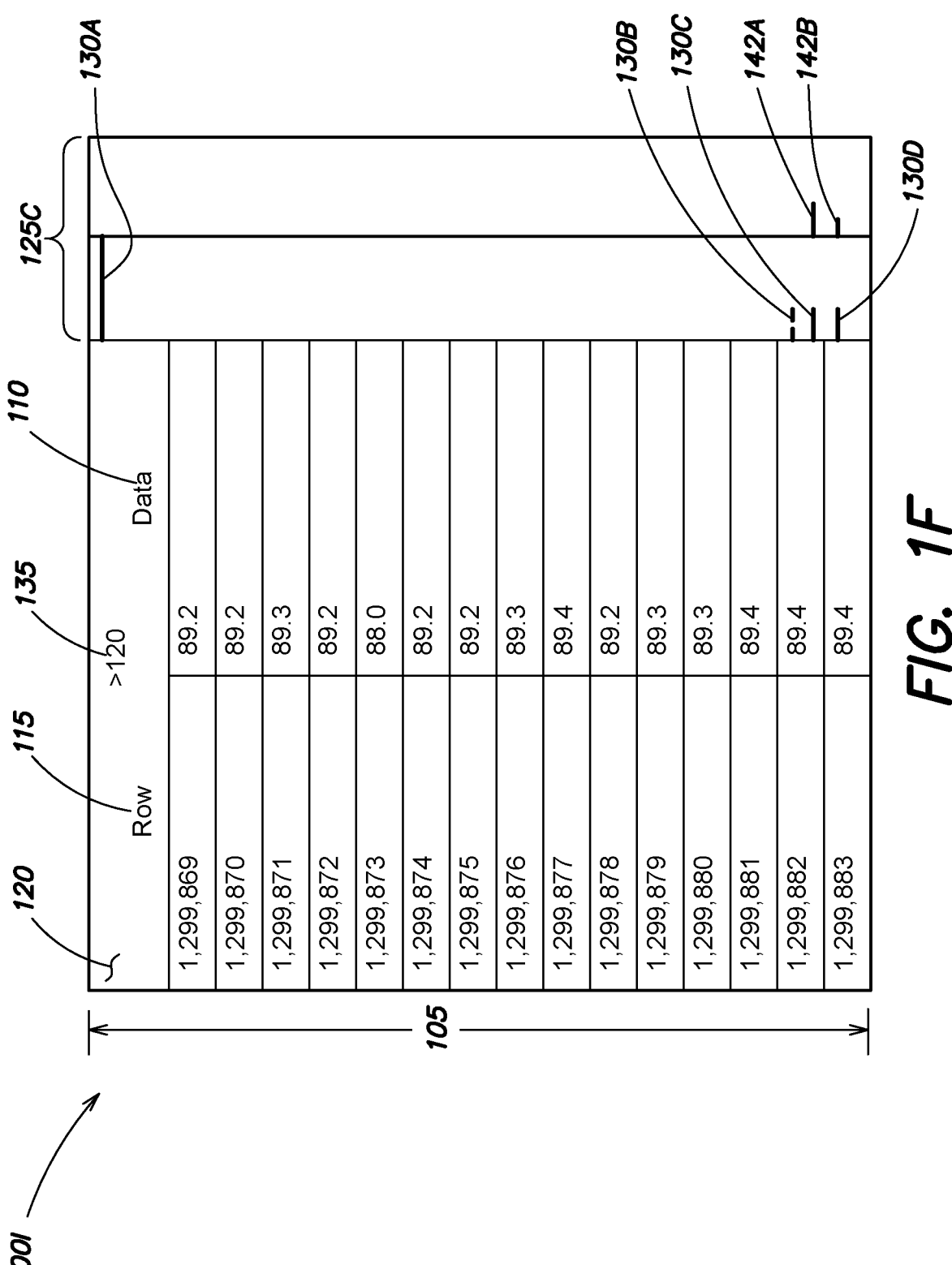
FIG. 1F is another example display screen that displays a portion of tabular data with a different visual construct that includes an additional level based on the selection of a different marker from the visual construct of FIG. 1A according to the one or more embodiments described herein.

FIG. 1F is another example display screen 100I that displays a portion of tabular data with a visual construct 125C that includes an additional level based on the selection of a different marker, 130B, according to the one or more embodiments described herein. The operation of visual construct 125C is similar to the operation of visual construct 125B of FIG. 1B. However, the additional level, e.g., right column, of visual construct 125C is generated based on a selection of marker 130B that represents rows 1,299,869 through 1,309,022 of the tabular data. Based on the selection of 130B, the visual construct module 210 may generate and display an additional level of visual construct 125C that represents rows 1,299,869 through 1,309,022 of the tabular data. Marker 130B is highlighted in FIG. 1F utilizing a dashed line to indicate that marker 130B is selected. Similar to FIG. 1B, each of markers 142A and 142B represents 62 different rows of the tabular data. However, markers 142A and 142B represent 62 different rows from among rows 1,299,869 through 1,309,022 of the tabular data.

In an embodiment, and based on the selection of marker 130B, the viewport 105 may be automatically adjusted such that a portion of the range of rows of the tabular data that are represented by marker 130B are displayed in the viewport 105. For example, and as depicted in FIG. 1F, rows 1,299,869 through 1,299,883 of the tabular data are displayed in viewport 105 based on the selection of marker 130B. As indicated above, any of a variety of different algorithms may be utilized to determine which of rows of 1,299,869 through 1,309,022 of the tabular data, that are represented by marker 130B, are displayed in viewport 105.

In a similar manner as described above, the locations of and visual attributes applied to markers 142A and 142B visually indicate locations of the search hits and their distribution across rows 1,299,869 through 1,309,022 of the tabular data. Specifically, because markers 142A and 142B are located near the bottom of the additional level of visual construct 125C, the location of markers 142A and 142B visually indicate that the search hits are distributed at rows that are near row 1,309,022 of the tabular data. Additionally, because marker 142A is wider than marker 142B, the visual attributes applied to the markers 142A and 142B visually indicate that there are more search hits in the rows of the tabular data that are represented by marker 142A than in the rows of the tabular data that are represented by marker 142B. Moreover, the lack of markers at particular locations on the additional level of visual construct 125C visually indicate that the rows of the tabular data that correspond to the particular locations include no search hits or an insignificant number of search hits, as described above with reference to FIGS. 1A and 1B.

As such, the user can utilize the visual construct according to the one or more embodiments described herein to navigate the tabular data and drill-down through the visual construct representing the tabular data to visually identify the search hits and distribution across different portions, e.g., rows, of the tabular data. Specifically, and as described above, markers 130A-130D can visually indicate locations of search hits and their distribution across the entirety of the tabular data. Additionally, markers 130A-130D can be selected to navigate through different portions of the tabular data and obtain a visual indication regarding search hits and their distribution across the different portions of the tabular data.

Based on the selection of a marker of the additional level, the visual construct module 210 may generate a further additional level of a visual construct. For example, and referring back to FIG. 1B, a user may select any of markers 140A-140C. Based on the selection, the visual construct 210 may generate a further additional level of the visual construct, wherein the further additional level represents the individual rows that are represented by the selected marker.

Figure 1G:
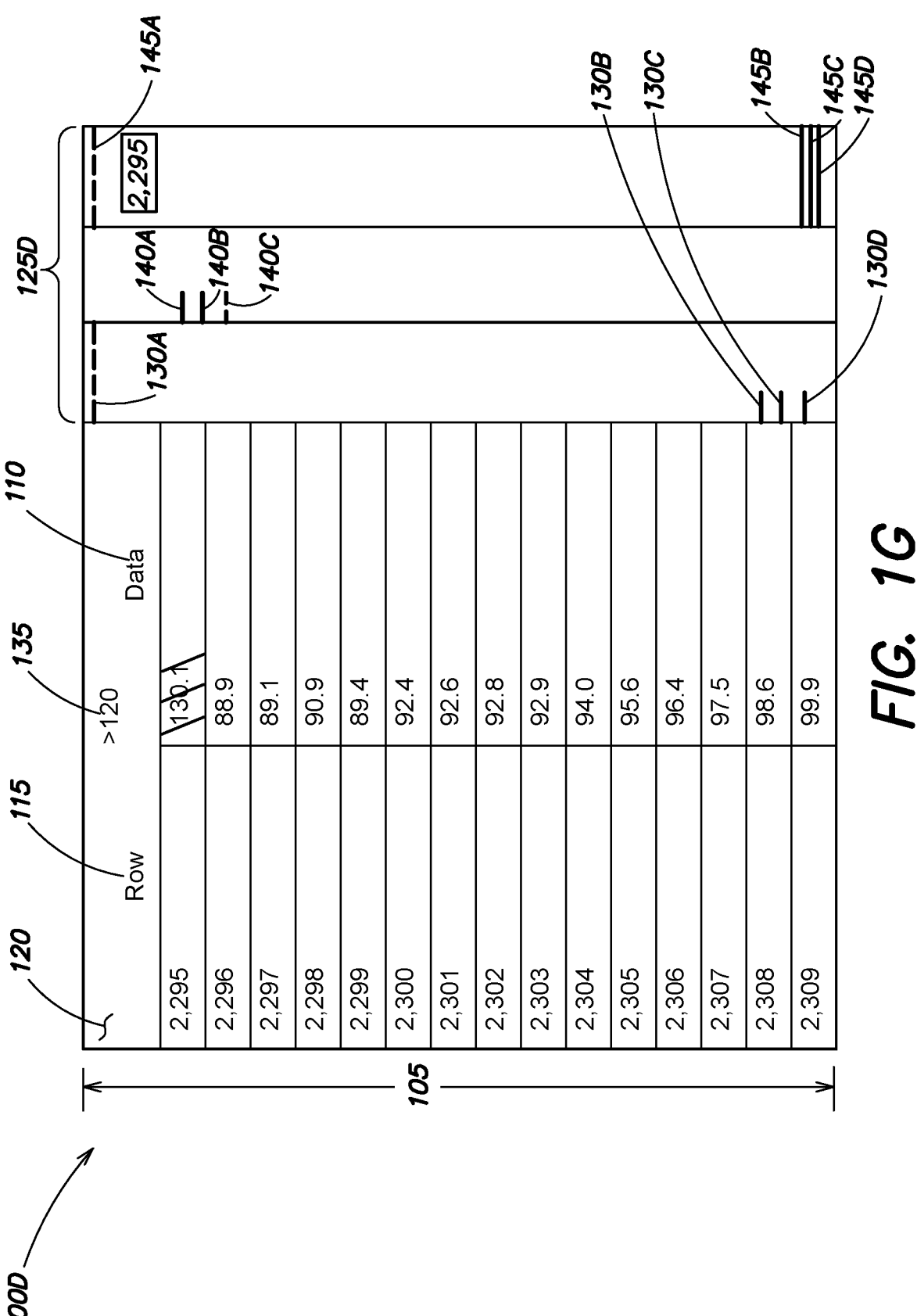
FIG. 1G is another example display screen that displays a portion of tabular data with a visual construct that includes an even further additional level based on the selection of a marker from the additional level of the visual construct of FIG. 1B according to the one or more embodiments described herein.

FIG. 1G is another example display screen 100D that displays a portion of tabular data with a visual construct 125D that includes an even further additional level based on the selection of marker 140C on visual construct 125B of FIG. 1B according to the one or more embodiments described herein. The visual construct 125D includes one level, e.g., left column, that represents the entirety of the tabular data and includes markers 130A-130D as described above with reference to FIG. 1A. The visual construct 125D also includes an additional or second level, e.g., middle column, that represents rows 1 through 9,154 that include markers 140A-140C based on the selection of marker 130A as described above with reference to FIG. 1B.

Additionally, visual construct 125D includes a further additional or third level, e.g., most right column, with markers 145A-145D based on the selection of marker 140C. Marker 140C is highlighted in FIG. 1D utilizing a dashed line to indicate that marker 140C is selected.

Each of markers 145A-145D may represent a single row of the tabular data. That is, instead of representing a set of rows like markers 130A-130D and 140A-140C, each of markers 145A-145D only represents a single different row of the tabular data. According to the one or more embodiments described herein, the number of rows of the tabular data and/or user configurable parameters may determine how many rows of the tabular data are represented by each marker, which in turn may affect the number of levels needed for a visual construct such that a single marker may represent a single row of the tabular data.

As explained above, marker 140C represents rows 2,295 through 2,356 of the tabular data. As such, the further additional level of the visual construct 125D, with markers 145A-145D, represents rows 2,295 through 2,356 of the tabular data. Specifically, the top of the further additional or third level with markers 145A-145D represents row 2,295 of the tabular data while the bottom of the further additional level with markers 145A-145D represents row 2,356 of the tabular data.

In a similar manner as described above, the locations of markers 145A-145D visually indicate locations of the search hits and their distribution across rows 2,295 through 2,356 of the tabular data. Specifically, because markers 145A is located near the top of the further additional level of visual construct 125D, the location of marker 145A visually indicates that there is a search hit near or at row 2,295 of the tabular data. Because markers 145B-145D are located near the bottom of the further additional level of visual construct 125D, the location of markers 145B-145D visually indicates that there are 3 clustered rows with search hits near row 2,356 of the tabular data.

Because each of markers 145A-145D represents a single row, instead of a group of rows, the visual attribute applied to each marker may have no significance. As such, the width (e.g., visual attribute) of each of markers 145A-145D can be same. In an embodiment, the markers 145A-145D may be provided any visual attribute, such as highlighting, to indicate that each marker represents a single row of the tabular data.

A user may move a cursor or pointing device over each of markers 145A-145D, and a graphic or text may be displayed to indicate the row, i.e., single row, of the tabular data that is represented by the marker. For example, and as depicted in FIG. 1D, the user has moved a cursor over marker 145A. Based on the cursor moving within a threshold distance of marker 145A, the visual construct module 210 may display a graphic or text indicating that marker 145A represents row 2295. As such, the user can determine that row 2295 of the tabular data, that is represented by marker 145A, includes a search hit. In an embodiment, the visual construct module 210 may also display the data value corresponding to marker 145A based on the movement of the cursor. For example, and based on the cursor moving within the threshold distance of marker 145A, the visual construct module 210 may display a graphic or text indicating that row 2295, that is represented by marker 145A and that includes a search hit, has a corresponding data value of 130.1.

In an embodiment, and based on the selection of marker 145A, the marker 145A may be highlighted as depicted in FIG. 1G. Additionally, and based on the selection of marker 145A, the viewport 105 may be automatically adjusted, as described above, such that the row 2295 of the tabular data that is represented by marker 145A is automatically displayed in the viewport 105.

Accordingly, the user can utilize visual construct 125D to navigate the tabular data and drill-down through different portions of the visual construct 125D to visually identify the search hits and distribution across the tabular data.

Additionally, and as described above, the user can manipulate the viewport 105 to affect the operation of the visual construct 125D. Consider the example of FIG. 1A, where the visual construct 125A only includes one column and markers 130A-130D. Additionally, and as depicted in FIG. 1A, rows 889 through rows 903 of the tabular data are displayed in viewport 105. For this example, let it be assumed that the user manipulates the viewport 105 to display rows 2,295 through rows 2,309 of the tabular data.

In response to this manipulation, the visual construct module 210 may transform the visual construct 125A of FIG. 1A to the visual construct 125D of FIG. 1G with particular highlighted markers. Specifically, and based on the manipulation, the visual construct module 210 may generate the levels of the visual construct 125D with their markers, wherein markers 130A, 140C, and 145A are high-lighted. Markers 130A, 140C, and 145A are highlighted because the rows of the tabular data that are displayed in the viewport 105 are determined to be represented by markers 130A, 140C, and 145A.

Specifically, rows 2,295 through 2,309 are within the range of rows 1 through 9,154 of the tabular data that are represented by marker 130A. As such, the visual construct module 210 highlights marker 130A. Rows 2,295 through 2,309 are not within the range of the rows of the tabular data that are represented by markers 130B-130D. Therefore, markers 130B-130D are not highlighted. Rows 2,295 through 2,309 are also within the range of rows 2,295 through 2,356 of the tabular data that are represented by marker 140C. As such, the visual construct module 210 highlights marker 140C. Rows 2,295 through 2,309 are not within the range of the rows of the tabular data that are represented by markers 140A and 140B. Therefore, markers 140A and 140B are not highlighted. Further, row 2,295 of the tabular data is represented by marker 145A and includes a search hit. As such, the visual construct module 210 highlights marker 145A. Markers 145B-145D represent single rows of the tabular data that include a search hit and are not within viewport 105. As such, markers 145B-145D are not highlighted.

Figure 2:
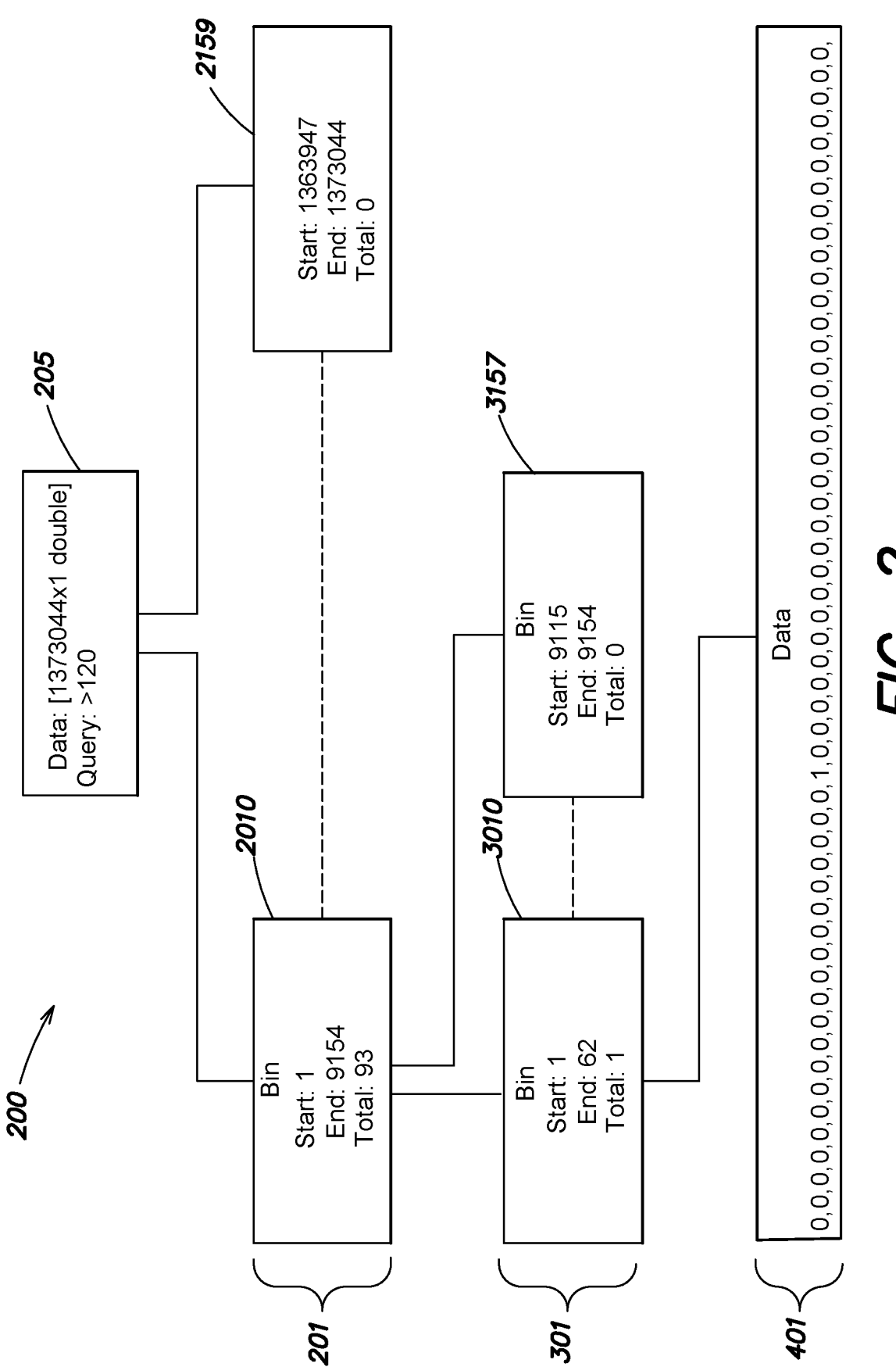
FIG. 2 is an example hierarchical data structure that may be constructed for the tabular data of FIGS. 1A-1G according to the one or more embodiments described herein.

In an embodiment, the visual constructs 125A-125D and 125G of FIGS. 1A-1G may be generated by visual construct module 210 based on hierarchical data structure 200 of FIG. 2 that is constructed according to the one or more embodiments described herein. As will be described in further detail below, the configuration of the hierarchal data structure may correspond to the configuration of the visual constructs 125A-125D and 125G. For example, and as will be described in further detail below, each level of the hierarchical data structure 200 may correspond to a different level of the visual constructs 125A-125D and 125G. Additionally, each node, i.e., bin, of the hierarchical data structure 200 may correspond to a different potential marker that can be displayed on visual constructs 125A-125D and 125G. As will be described in further detail below, the values stored in the nodes of the hierarchical structure 200 may be based on the search results, and the stored values may be utilized to determine whether markers are displayed on the visual constructs 125A-125D and 125G and the visual attributes applied to the displayed markers.

FIG. 2 is an example hierarchical data structure 200 that may be constructed for the tabular data of FIGS. 1A-1G according to the one or more embodiments described herein. Hierarchical data structure 200 includes root node 205 that includes information identifying the tabular data and the search query utilized to search the tabular data. As such, and in this example, root node 205 includes information identifying the tabular data as an array of data that includes 1,373,044 rows and 1 column. Additionally, the root node 205 includes information indicating that the tabular data is searched to identify values that are greater than 120.

In an implementation, the levels, e.g., 201, 301, and 401, of the hierarchical data structure 200 may correspond to levels of the visual constructs 125A-125D and 125G. For illustrative purposes, the following description may at times only refer to visual construct 125D of FIG. 1G that includes 3 levels. However, it should be expressly understood that hierarchical data structure 200 relates to and is utilized also for generating visual constructs 125A-125C and 125G.

Level 201 of the hierarchical data structure 200 may correspond to the left column of visual construct 125D that represents the entirety of the tabular data and includes markers 130A-130D. Level 201 includes 150 nodes and, specifically, nodes 2010 through 2159. For simplicity, only nodes 2010 and 2159 are included in FIG. 2, however it is expressly contemplated that level 201 includes all 150 nodes, as indicated by dashed lines, from node 2010 through node 2159. As will be described in further detail below, each of nodes 2010 through 2159 may (1) represent a different portion of the 1,373,044 rows of the entire tabular data, and (2) correspond to a different marker that might be displayed in the left column of visual construct 125D. As will also be described in further detail below, the visual construct module 210 may generate the left column of visual construct 125D with markers 130A-130D based on nodes 2010 through 2159 of level 201.

Level 301 of the hierarchical data structure 200 may correspond to the middle column of the visual construct 125D with markers 140A-140C. Level 301 includes a plurality of nodes, e.g., sub-nodes, for each of nodes 2010 through 2159 of level 201. For simplicity, only 148 nodes and, specifically, nodes 3010 through 3157 for node 2010 are included in FIG. 2, as indicated by dashed lines. However, it is expressly contemplated that level 301 includes sub-nodes for each of nodes 2010 through 2159 of level 201. In this example, level 301 includes 22,146 sub-nodes and, specifically, sub-nodes 3010 through 25155. Each of sub-nodes 3010 through 25154 represent 62 rows of the tabular data, while sub-node 25155 represents the last 54 rows, e.g., rows 1372991 through 1,373,044, of the tabular data. As will be described in further detail below, each of nodes 3010 through 25155 may (1) refer to a single node, i.e., parent node, in level 201, (2) represent a different portion of rows from its parent node, and (3) correspond to a different marker that might be displayed in the middle column of visual construct 125D. As will also be described in further detail below, the visual construct module 210 may generate the middle column of visual construct 125D with markers 140A-140C based on sub-nodes 3010 through 25155 of level 301.

Level 401 of the hierarchical structure 200 may correspond to the right column of the visual construct 125D with markers 145A-145D. Level 401 includes references to the search hits for the tabular data. As will be described in further detail below, the visual construct module 210 may generate the right column of visual construct 125D with markers 145A-145D based on level 401. In an implementation, the visual construct module 210 can construct the levels (e.g., 201, 301, and 401) and nodes of the hierarchal data structure 200 based on a size of the tabular data and a maximum number of markers that can be displayed on the levels of visual construct 125D.

For this example, let it be assumed that the viewport 105 has a height in pixels of 300 pixels. Therefore, and in this example, each level of visual construct 125D are constrained in height to not exceed a height of 300 pixels. Stated another way, each level of visual construct 125D has a maximum height that is substantially equal to 300 pixels. Additionally, and for this example, let it be assumed that each marker of visual construct 125D is to have a height of 1 pixel when displayed and that there is a 1 pixel spacing requirement between consecutive markers to ensure that consecutive markers can be visually differentiated from each other. If there is a zero-pixel spacing between consecutive markers (e.g., two markers that are on top of each other), a user may not be able to visually differentiate the consecutive markers and may mistakenly conclude that consecutive markers are a single marker. Although the example as described herein utilizes markers that are 1 pixel in height with 1 pixel spacing, it is expressly contemplated that any criterion regarding marker height and spacing may be utilized according to the one or more embodiments described herein. In an implementation, the size and spacing of the markers may be referred to as display characteristics.

Visual construct module 210 can utilize the display characteristics with the size of the viewport to determine the maximum number of markers that can be displayed in a level of visual construct 125D. In an implementation, the visual construct module 210 can calculate the maximum number of markers that can be displayed as:

Maximum number of markers that can be displayed=height of viewport in pixels/(height of marker in pixels+desired spacing between consecutive markers in pixels).

Therefore, and for this example, the visual construct module 210 can determine that the maximum number of markers that can be displayed in a level of visual construct 125D is 150 (e.g., 300 pixels/(1 pixel+1 pixel)). Meaning that 150 markers is the maximum number of markers that can be displayed in a level of visual construct 125D with each marker being 1 pixel in height and having a 1 pixel spacing between the markers. As such, a table that is 150 rows would be the maximum size such that all rows of the table can be represented by a different marker in a level of the visual construct 125D.

If the tabular data is greater than 150 rows, the visual construct module 210, according to the one or more embodiments described herein, can divide the rows of the tabular data into portions.

For example, and as previously explained, the hierarchical data structure 200 is generated for the tabular data that includes 1,373,044 rows of temperature readings. Because 1,373,044 exceeds 150, which is the maximum number of markers that can be displayed in a level of visual construct 125D, the visual construct module 210 determines that each row of the 1,373,044 rows cannot be represented by a different marker such that all markers can be displayed in the visual construct with a height of 1 pixel and a 1 pixel spacing. To display all markers for the 1,373,044 rows with a height of 1 pixel and with 1 pixel spacing, the height of the visual construct would have to be 2,746,088 pixels. Therefore, the visual construct module 210 determines that the tabular data needs to be divided into portions utilizing the hierarchical data structure 200 that includes levels with nodes, where each node represents a different number of rows of the tabular data.

Referring now to FIG. 2, because the number of rows of the tabular data exceeds the maximum number of markers that can be displayed, the visual construct module 210 determines that level 201 of the hierarchical data structure 200 is to be generated and include a number of nodes that equals the maximum number of markers that can be displayed, e.g., 150 markers. As such, and in this example, the visual construct module 210 generates level 201 with 150 nodes, e.g., nodes 2010 through 2159. Additionally, the visual construct module 210 assigns a different portion of the 1,373,044 rows of the tabular data to each of nodes 2010 through 2159. For this example, the visual construct module 210 divides the tabular data such that the first 149 nodes of level 201, e.g., nodes 2010 through 2158, represent 9,154 different rows of the tabular data, while the last node, e.g., node 2159, of level 201 represents the last 9,098 rows of the tabular data. According to the one or more embodiments described herein, it is expressly contemplated that the visual construct module 210 may utilize any of a variety of algorithms and/or techniques to divide the rows of the tabular data among nodes 2010 through 2159. Additionally, although level 201 includes 150 nodes, it is expressly contemplated that level 201 may include fewer or more nodes, and the use of 150 nodes is for exemplary purposes only.

For the hierarchical data structure 200 of FIG. 2, node 2010 of level 201 represents rows 1 through 9,154 of the tabular data, node 2011 (not shown) of level 201 represents rows 9,155 through 18,308 of the tabular data, node 2012 (not shown) of level 201 represents rows 18,309 through 27,462 of the tabular data, . . . and node 2159 of level 201 represents rows 1,363,947 through rows 1,373,044 of the tabular data.

As illustrated in FIG. 2, the visual construct module 210 may store, in each of the nodes of level 201, information indicating the starting and ending rows of the tabular data that are represented by the node. Additionally, the visual construct module 210 may store, in each node of the level 201, a total value that indicates the total number of search hits in the rows represented by the corresponding node. For example, node 2010 stores information indicating that node 2010 represents rows 1 through 9,154 of the tabular data. Additionally, node 2010 stores information indicating that there are a total of 93 search hits in rows 1 through 9,154 of the tabular data. Similarly, node 2159 stores information indicating that node 2159 represents rows 1,363,947 through rows 1,373,044 of the tabular data, and that rows 1,363,947 through rows 1,373,044 of the tabular data include zero search hits.

Each of nodes 2010 through 2159 of level 201 may correspond to a different marker that may be potentially displayed in the left column of visual construct 125D as depicted in FIG. 1D. For example, node 2010 may correspond to a first potential marker that may be displayed at the top of the left column of visual construct 125D. Node 2011 may correspond to a second potential marker that may be displayed next on the left column of visual construct 125D after a 1 pixel spacing. Node 2012 may correspond to a third potential marker that may be displayed next on the left column of visual construct 125D after another 1 pixel spacing, and so forth. As such, all 150 markers corresponding to nodes 2010 through 2159 can potentially fit and be displayed on the left column of visual construct 125D in a single instance such that the entirety of the tabular data can be represented.

The visual construct module 210 may utilize the search hit information stored in each of the nodes of level 201 to (1) determine if a marker corresponding to the node should be displayed, and (2) the visual attribute to be applied to the marker if the marker is to be displayed. For example, and with reference to FIG. 2, node 2010 of level 201 stores information indicating that rows 1 through 9,154 of the tabular data includes 93 search hits, e.g., 93 data values that are greater than 120. Since this value is greater than the threshold value of 5, the visual construct module 210 determines that marker 130A, which corresponds to node 2010 and represents rows 1 through 9,154, is to be displayed on the left column of visual construct 125D of FIG. 1G. As explained above with reference to FIG. 1A, the visual construct module 210 determines that marker 130A should be displayed at the top on the left column of visual construct 125D to visual indicate that there are search hits at the beginning rows of the tabular data.

Further and referring to FIG. 2, node 2152 (not shown) represents rows 1,299,869 through 1,309,022 of the tabular data and corresponds to marker 130B. Additionally, node 2153 (not shown) represents rows 1,309,023 through 1,318, 176 of the tabular data and corresponds to marker 130C. Further, node 2154 (not shown) represents rows 1,318,177 through 1,327,330 of the tabular data and corresponds to marker 130D. In this example, let it be assumed that nodes 2152, 2153, and 2154 store search hit information indicating that the rows that are represented by nodes 2152, 2153, and 2154 respectively include 23, 21, and 18 search hits. 23, 21, and 18 are values that are greater than the threshold value of 5 search hits. As such, the visual construct module 210 determines that markers 130B, 130C, and 130D are to be displayed at the bottom on the left column of visual construct 125D to visually indicate that there are search hits at the ending rows of the tabular data.

In this example, let it be assumed that nodes 2011 through 2151 and nodes 2155 through 2159 store search hit information indicating that the rows represented by nodes 2011 through 2151 and nodes 2155 through 2159 include no search hits or an insignificant number of search hits, e.g., less than 5 search hits. As such, visual construct module 210 determines that the markers corresponding to nodes 2011 through 2151 and 2155 through 2159 are not to be displayed on the left column of visual construct 125D.

In addition to utilizing the search hit information to determine if a corresponding marker should or should not be displayed, the visual construct module 210 may also utilize the search hit information to determine the visual attributes that are to be applied to the markers that are to be displayed on the left column of visual construct 125D. For the example of FIG. 2, node 2010 indicates that rows 1 through 9,154 of the tabular data includes 93 search hits. The visual construct module 210 may perform a plurality of comparisons and determine that the total value (i.e., total search hits) of 93 that is stored in node 2010 is the greatest value of all the total values stored in all of nodes 2010 through 2159. Because node 2010 includes the greatest number of search hits of level 201, the visual construct module 210 may determine that the marker 130A corresponding to node 2010 is to be applied the largest/greatest visual attribute. In the examples described herein, the visual attribute is a width of a marker. As such, marker 130A can be applied a width that is wider than all markers that are to be displayed on the left column of visual construct 125D.

Further, and as explained above, node 2152 (not shown) corresponds to marker 130B and indicates that the represented rows include 23 search hits. Additionally, node 2153 (not shown) corresponds to marker 130C and indicates that the represented rows include 21 search hits. Further, node 2154 (not shown) corresponds to marker 130D and indicates that the represented rows include 18 search hits.

Markers 130B-130D, that correspond to nodes 2152 through 2154, can be applied widths that are proportional to the width applied to marker 130A. For example, the visual construct module 210 may determine that the rows represented by markers 2152 through 2154 include a number of search hits (e.g., 23, 21, and 18 search hits) that is approximately a quarter of the 93 search hits indicated in node 2010 that corresponds to marker 130A. As such, the visual construct module 210 can display markers 130B-130D with widths that are approximately a quarter of the size of the width of marker 130A. As such, the applied widths of markers 130B-130D are relatively similar and visually indicate that the rows that are represented by markers 130B-130D have a similar number of search hits. Additionally, and because marker 130A is applied a wider width than markers 130B-130D, a visual indication is provided that the rows represented by marker 130A include a greater number of search hits than the rows that are represented by markers 130B-130D. Moreover, and because markers 130B-130D are approximately a quarter of the width of marker 130A, a visual indication is provided that the number of search hits in the rows represented by markers 130B-130D is approximately a quarter of the number of search hits in the rows represented by marker 130A.

Although reference is made to utilizing width of the markers 130A-130D to provide a visual indication regarding the number of search hits in the rows represented by markers 130A-130D, it is expressly contemplated that any of a variety of different visual attributes may be utilized according to the one or more embodiments described herein. For example, such visual attributes may include, but are not limited to, opacity, color, highlighting, size of graphical marker, etc.

Therefore, the visual construct module 210 may utilize nodes 2010 through 2159 of level 201 of the hierarchical data structure 200 to generate the left column of visual construct 125D with markers 130A-130D to visually indicate locations of the search hits and their distribution across the entirety of the tabular data.

As an illustrative example, let it be assumed that a user performs a search of the tabular data for data values that are greater than 120. Based on the search, the visual construct module 210 may generate root node 205 and level 201 with nodes 2010 through 2159 of hierarchical data structure 200 as described above. The visual construct module 210 may access the hierarchical data structure 200 and utilize the search hit information in nodes 2010 through 2159 to generate the left column of visual construct 125D with markers 130A-130D. Although reference is made to the left column of visual construct 125D in FIG. 1D, it is expressly contemplated that the visual construct 125A and the left column of visual constructs 125B, 125C, and 125G would be generated in a similar manner and using the search hit information in nodes 2010 through 2159.

The visual construct module 210 may also generate level 301 of the hierarchical data structure 200. Level 301 corresponds to the additional, e.g., right column, of visual constructs 125B, 125C, and 125G of FIGS. 1B-1F and the middle column of visual construct 125D of FIG. 1G. Although the following description for level 301 may refer to the additional levels of visual construct 125B and/or visual construct 125C, it is expressly contemplated that the following description may apply to the additional column of visual construct 125G of FIG. 1E and the middle column of visual construct 125D of FIG. 1G.

The generation of level 301 of the hierarchical data structure 200 may be based on the nodes in level 201. In this example, each of nodes 2010 through 2159 of level 201 represents a number of rows that is greater than the maximum number of markers that can be displayed in a level of visual constructs 125B and 125C. Accordingly, visual construct module 210 determines that level 301 cannot reference the individual rows. Instead, level 301 needs to include nodes, e.g., sub-nodes, that reference multiple rows. Accordingly, the visual construct module 210 generates level 301 of hierarchical of data structure 200, where level 301 includes sub-nodes for each of nodes 2010 through 2159. In an embodiment, a sub-node is used to refer to a node that is a child and referenced by a parent node. For example, because nodes 3010 through 3157 of level 301 are referenced by node 2010 of level 201, nodes 3010 through 3157 may be referred to as both nodes and sub-nodes.

For example, the visual construct module 210 may generate sub-nodes 3010 through 3157 at level 301 for node 2010 of level 201. Each of sub-nodes 3010 through 3157 may represent a different portion of rows 1 through 9,154 that are represented by node 2010 of level 201. For example, sub-node 3010 may represent rows 1 through 62 of the tabular data, sub-node 3011 (not shown) may represent rows 63 through 124, sub-node 3012 (not shown) may represent rows 125 through 186, . . . , and sub-node 3157 may represent rows 9,115 through 9,154. Each of sub-nodes 3010 through 3157 corresponds to a different potential marker that may be displayed in the additional level, e.g., right column of visual construct 125B and middle column of visual construct 125D, if marker 130A is selected.

For example, and based on performing the search, the visual construct module 210 may generate and display the level, e.g., left column, of visual construct 125B with markers 130A-130D in the manner described above. Based on the selection of marker 130A on visual construct 125A of FIG. 1A, the visual construct module 210 may access hierarchical data structure, and identify node 2010 of level 201 that corresponds to marker 130A. Based on identifying node 2010, the visual construct module 210 may access sub nodes 3010 through 3157 of level 301 and utilize the search hit information stored in nodes 3010 through 3157 to generate and display the additional level, e.g., right column, of visual construct 125B with markers 140A-140C as depicted in FIGS. 1B and 1C. A similar operation would be performed by the visual construct module 210 when marker 130A is selected such that the additional level, e.g., middle column, of visual construct 125D is generated with markers 140A-140C in FIG. 1G.

If, however, marker 130B was selected, the visual construct module 210 would access hierarchical data structure 200 and identify node 2152 (not shown) of level 201 that corresponds to marker 130B. Based on identifying node 2152, the visual construct module 210 may access the sub-nodes (not shown) of level 301 that are referenced by node 2152 and utilize the search hit information stored in the sub-nodes (not shown) to generate and display the additional level of visual construct 125C with markers 142A and 142B as depicted in FIG. 1F.

Therefore, and based on the selection of particular markers on a visual construct, the visual construct module 210 may access the hierarchical data structure 200 to access nodes and/or sub-nodes to generate an additional level of the visual construct with markers.

The hierarchical data structure 200 may further include level 401. The following description for level 401 will refer to the visual construct 125D of FIG. 1G. Each of the sub-nodes in level 301 of the hierarchical data structure 200 represents a number of rows that is less than 150, which is the maximum number of markers that can be displayed on a level of visual construct 125D. Specifically, each of sub-nodes 3010 through 25154 represent 62 rows of the tabular data, while sub-node 25155 represents the last 54 rows, e.g., rows 1372991 through 1,373,044, of the tabular data. Because 62 and 54 are less than 150, the visual construct module 210 determines that all 62 or 54 rows, represented by the sub-nodes in level 310, can be displayed on the display screen with a 1 pixel spacing.

As such, the rows represented by the sub-bins of level 301 do not have to be further divided, and the visual construct module 210 generates level 401 instead of generating an additional level with sub-nodes. Level 401 stores the search hit information for each of rows represented by a corresponding sub-node of level 301. For simplicity and ease of understanding, level 401 of FIG. 2 only includes search hit information for the rows represented by sub-node 3010 of level 301. However, it should be understood that level 401 includes the search hit information for all the rows represented by each sub-node in level 301

As depicted in level 401, sub-node 3010 references at level 401 a 1×62 array that represents rows 1 through 62 of the tabular data. The 1×62 array includes values with all zeros and a value of 1 in the $21^{st}$ column of the array, where a value of 1 may indicate a search hit while a value of 0 may indicate no search hit. As such, the array indicates that row 21 of the tabular data includes a search hit while rows 1 through 20 and 22 through 62 do not include a search hit. As such, and when a marker corresponding to sub-node 3010 is selected from the middle column of a visual construct 125D, the visual construct module 210 may identify the sub-node 3010. The visual construct module 210 may then access the 1×62 array and display a marker at the 21st position on visual construct 125D.

As an illustrative example, consider that a user selects marker 130A of visual construct 125D of FIG. 1G, such that middle column with markers 140A-140C are displayed. Additionally, assume that a user then selects a top position of the middle column (with markers 140A-140C) from visual construct 125D. In this example, there is no marker at this top position of the middle column, and instead there are only markers 140A-140C as depicted in FIG. 1G, at locations part way down in the middle column. However, the user is still able to select this top position that would correspond to node 3010 of level 301. As indicated in the search hit information of level 401 that is referenced by sub-node 3010, rows 1 through 62 of the tabular data include a total of 1 search hit. Therefore, because 1 is less than threshold value of 5, there is an insignificant number of search hits for rows 1 through 62 that corresponds to node 3010. As such, a marker is not displayed at the top position in the middle level of visual construct 125D.

However, the user can still select the top position of the middle level of visual construct 125D to visually identify the distribution of the insignificant number of search hits. For example, and based on the selection of the top position in the middle level of the visual construct 125D, the visual construct module 210 may access the 1×62 array of level 401. The visual construct module 210 can then display a marker (not shown) on the right column of visual construct 125D to visually indicate a search hit at row 21 of the tabular data. That is, and instead of the right column of visual construct 125D including markers 145A-145D as depicted in FIG. 1G, the visual construct 125D would include a marker for the search hit at row 21 of the tabular data. Therefore, the search hits in the individual rows of the tabular data, which are in the range of rows that are represented by a potential marker and that include an insignificant number of search hits, can still be identified according to the one or more embodiments described herein.

Accordingly, and in this example, although no marker was displayed at the top position in the middle column of visual construct 125D, the user can still select that position to identify where the insignificant search hits are located in the tabular data. Therefore, and based on the selection of different locations and/or markers of the visual construct 125D of FIG. 1G, for example, the visual construct module 210 may access the hierarchical data structure 200 and identify the nodes and/or sub-node that corresponds to the selected markers. The visual construct module 210 may then display additional markers, as described above, such that the user can navigate the tabular data and visually identify the search hits and their distribution across the tabular data.

Accordingly, the visual constructions 125A-125D and 125G, which are interactive user interfaces, are directed to a particular manner of summarizing and presenting (i.e., displaying) search results for tabular data. Specifically, the visual constructs 125A-125D and 125G with levels and markers can be displayed to substantially match a size of a viewport while also representing the entirety of the tabular data that cannot fit within the viewport. Advantageously, a user can use the levels and markers of the visual constructs 125A-125D and 125G to drill-down through different portions of the tabular data to visually identify the search results and their distribution across the different portions, and then to drill-down to the individual rows of the tabular data. Advantageously, a user can utilize the visual constructs 125A-125D and 125G to more quickly and efficiently navigate through the tabular data and understand the tabular data when compared to conventional systems and technique that, for example, require the user to manually scroll through the tabular data using the viewport. Accordingly, the one or more embodiments described herein provide an improvement in the functioning of computers and also provide an improvement in the technological field of computer user interfaces.

Figure 3:
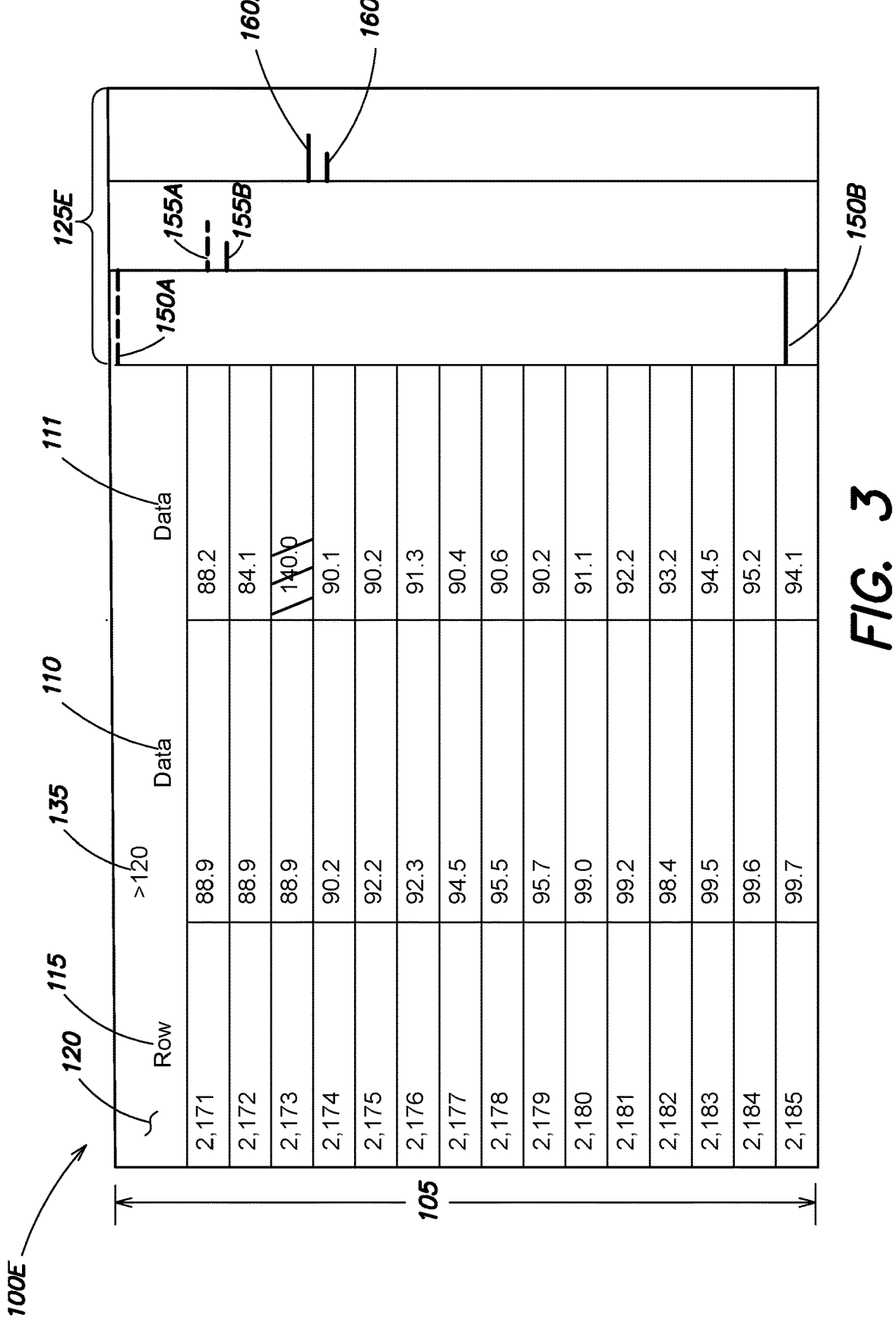
FIG. 3 is another example display screen that displays a portion of tabular data including two data columns with a visual construct that visually indicates locations of search hits and their distribution across rows and aggregated across both data columns according to the one or more embodiments described herein.

FIG. 3 is an example display screen 100E that displays a portion of tabular data including two data columns with a visual construct according to the one or more embodiments described herein. Specifically, and in the example of FIG. 3, the tabular data is 1,373,044 rows and 2 columns of data. The first column of data 110 includes 1,373,044 temperature readings that are the same temperature readings for the above examples. The second column of data 111 includes an additional 1,373,044 temperature readings.

The visual construct 125E is generated and displayed by the visual construct module 210 in a similar manner as described above with reference to visual construct 125D of FIG. 1G. However, in the example of FIG. 3, the search hits are aggregated across both columns 110 and 111.

For the example of FIG. 3, let it be assumed that marker 150A represents rows 1 through 9,154 of the tabular data. That is, marker 150A of visual construct 125E and marker 130A of visual construct 125D both represent rows 1 through 9,154 of the tabular data. However, to determine the search hits across rows 1 through 9,154 that is represented by marker 150A, the visual construct module 210 utilizes the values of both columns 110 and 111 to determine the search hits. In an implementation, the visual construct module 210 may implement any a variety of known techniques or algorithms to aggregate the search hits across multiple columns for a single row. For example, each row of the tabular data of FIG. 3 can have either 0, 1, or 2 search hits.

Therefore, the visual construct 125E of FIG. 3 provides a visual indication regarding search hits, aggregated across both columns, and their distribution across the tabular data. In this example, let it be assumed that a user selects marker 150A and then marker 155A. Based on the subsequent selection of marker 155A, the viewport 105 may be automatically adjusted, as described above, to display rows of the tabular data corresponding to marker 155A. In the example of FIG. 3, marker 155A represents rows 2,171 through 2,232 of the tabular data. As such, the viewport 105 may be automatically adjusted to display rows 2,171 through 2,185 of the tabular data.

In an embodiment, the visual construct module 210 may generate hierarchical data structure 200 for the tabular data of FIG. 3. The hierarchical data structure 200 generated for the tabular data of FIG. 3 will have the same structure, e.g., levels, nodes, and sub-nodes, as the hierarchical data structure 200 generated for the tabular data of FIG. 1G that includes a single data column. However, the search hit information stored in the nodes and sub-nodes of the hierarchical data structures 200 generated for the tabular data of FIG. 3 will be different. Specifically, the search hit information stored in the nodes and sub-nodes for the hierarchical data structure generated for the tabular data of FIG. 3 will be aggregated across both columns 110 and 111.

The visual construct module 210 can utilize the hierarchical data structure, generated for the tabular data of FIG. 3, to generate visual construct 125E. Specifically, the visual construct module 210 would utilize the search hit information stored in the nodes and sub-nodes of the hierarchical data structure 200 to determine that markers 150A, 150B, 155A, 155B, 160A, and 160B are to be displayed on visual construct 125E at their respective locations and with the applied visual attributes as depicted in FIG. 3. As such, the visual construct 125E can be utilized to navigate the tabular data that includes multiple data columns and visually identify the search hits across the tabular data that includes multiple data columns. Although the example of FIG. 3 describes generating a single visual construct 125E for the tabular data that includes a plurality of columns, it is expressly contemplated that a different visual construct (not shown) for each of columns 110 and 111 may be generated in a similar manner as described above with reference to FIGS. 1A-1G. For example, the visual construct module 210 may display the visual construct generated for column 110 adjacent to viewport 105 based on, for example, a user selecting column 110 (e.g., using an input device to select column 110). The visual construct module 210 may display the visual construct generated for column 111 adjacent to viewport 105 based on, for example, a user selecting column 111 (e.g., using an input device to select column 111).

Figure 4:
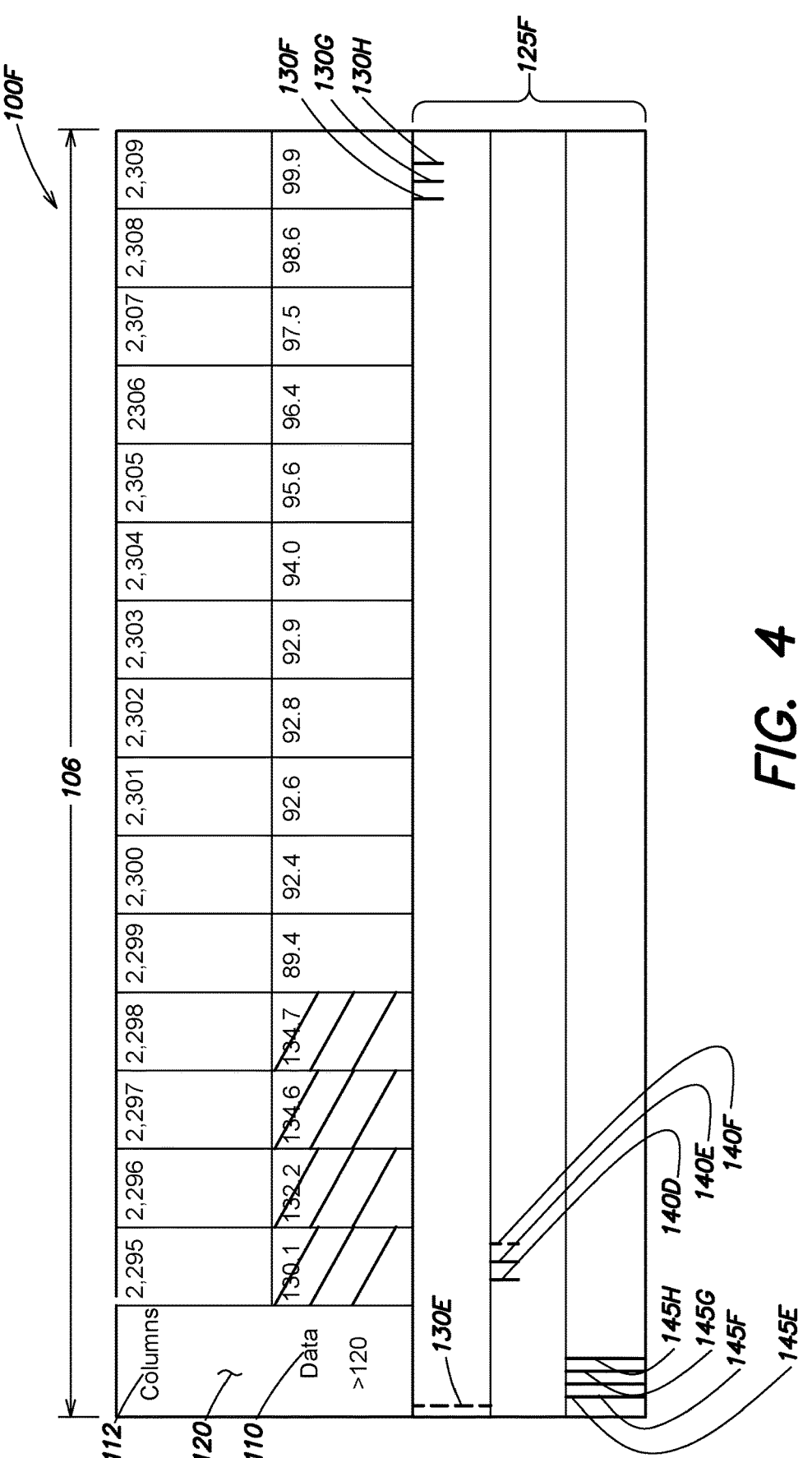
FIG. 4 is another example display screen that displays a portion of tabular data including a singular row and multiple columns with a visual construct that visually indicates locations of search hits across columns, not rows, according to the one or more embodiments described herein.

FIG. 4 is another example display screen 100F that displays a portion of tabular data including a singular row of data and multiple columns with a visual construct according to the one or more embodiments described herein. Specifically, and in the example of FIG. 4, the tabular data is 1 row and 1,373,044 columns of temperature readings. The visual construct 125F would operate in a similar fashion as the visual construct 125D of FIG. 1G. However, instead of determining the search hits across rows as described above with references to FIG. 1G, the visual construct module 210 determines the search hits across columns 112 of the tabular data of FIG. 4. Viewport 106 of FIG. 4 has a width instead of having a height like the viewports 105 of FIGS. 1A-1G and 3. Additionally, the left most edge of visual construct 125F would represent a beginning column of the tabular data while the right most edge of the visual construct 125F would represent an ending column of the tabular data.

In an embodiment, the visual construct module 210 may generate hierarchical data structure 200 for the tabular data of FIG. 4. The hierarchical data structure 200 generated for the tabular data of FIG. 4 may have the same structure, e.g., levels, nodes, and sub-nodes, as the hierarchical data structure 200 generated for the tabular data of FIG. 1G that includes a single data column. Specifically, level 201 and its nodes would correspond to the top/first level, e.g., top row, of the visual construct 125F with markers 130E-130H. Level 301 and its nodes would correspond to the middle/second level, e.g., middle row, of visual construct 125F with markers 140D-140F. Level 401 and its reference to individual rows would correspond to the last/third level, e.g., bottom row, of visual construct 125F with markers 145E-145H. Additionally, each node and sub-node of the hierarchical data structure 200 generated for the tabular data of FIG. 4 would reference a starting and ending column instead of a starting and ending row. Further, each node and sub-node would store search hit information across columns instead of rows.

As such, the hierarchical data structure 200 for the tabular data of FIG. 4 can be utilized to generate visual construct 125F of FIG. 4. Vertical markers 130E-130H on visual construct 125F provide a visual indication regarding the search hits and their distribution across the entirety of the columns of the tabular data of FIG. 4. Additionally, and based on the selection of marker 130E as indicated with a dashed line, the visual construct module 210 may generate the additional middle level of visual construct 125F with vertical markers 140D-140F that provide a visual indication regarding search hits and their distribution across columns that are represented by marker 130E. Further, and based on the selection of marker 140F as indicated with a dashed line, the visual construct module 210 may generate the last level, e.g., bottom row, of visual construct 125F with vertical markers 145E-145H that provide a visual indication regarding search hits and their distribution across certain individual columns of the tabular data of FIG. 4. Based on the subsequent selection of marker 140F, the viewport 105 may be automatically adjusted, as described above, to display columns of the tabular data corresponding to marker 140F. In the example of FIG. 4, marker 140F represents column 2,295 through 2,356 of the tabular data. As such, the viewport 105 may be automatically adjusted to display columns 2,295 through 2,309 of the tabular data.

Figure 5:
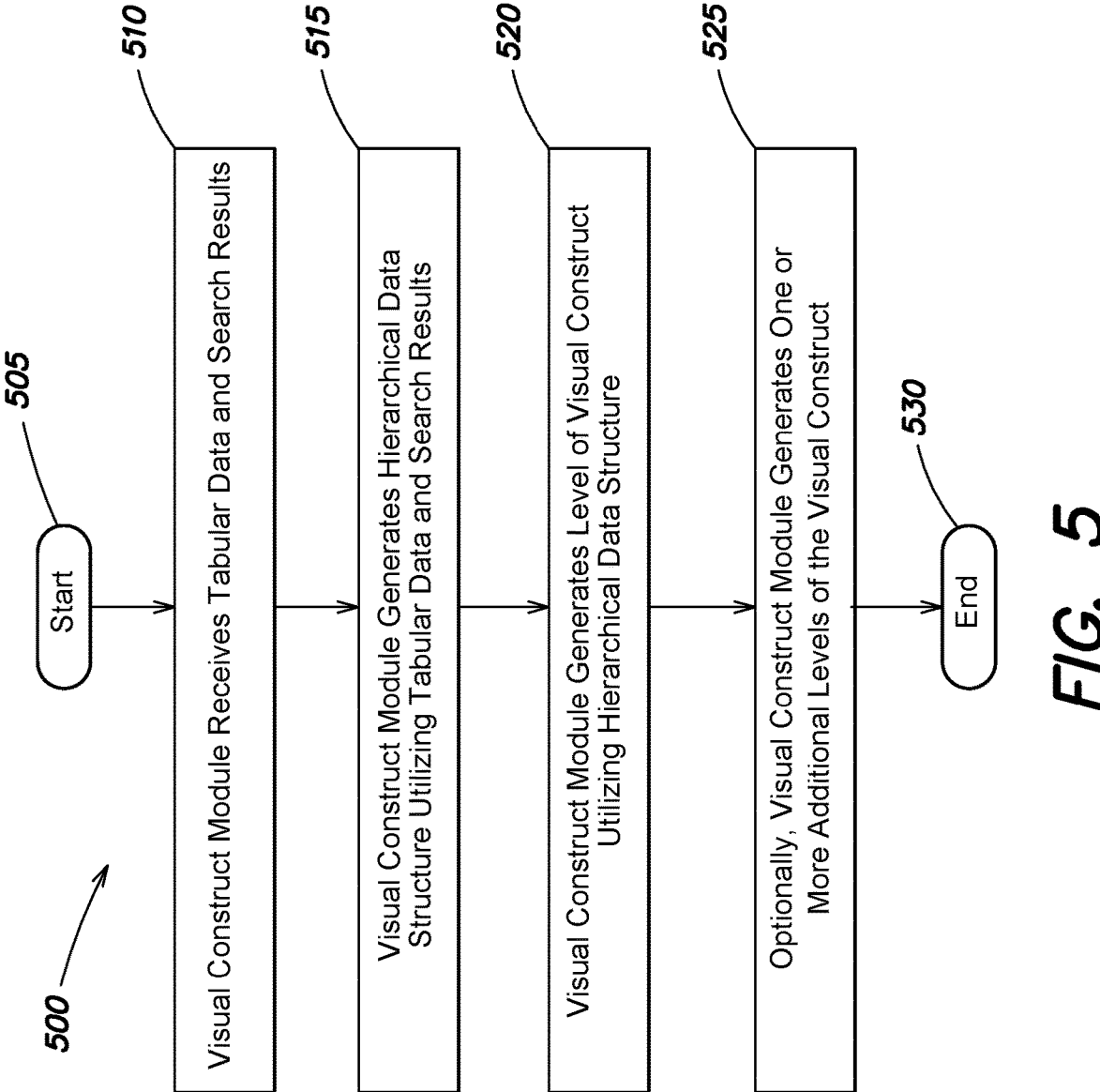
FIG. 5 is a flow diagram of an example method for generating a visual construct according to the one or more embodiments described herein.

FIG. 5 is a flow diagram of an example method for generating a visual construct according to the one or more embodiments described herein. The Procedure 500 starts at step 505 and continues to step 510 where visual construct module 210 receives tabular data and search results for the tabular data. For example, the visual construct module 210 may receive the tabular data of FIGS. 1A-1G that include 1,373,044 rows of temperature readings. The received search results may indicate which rows of the tabular data include values that are greater than 120 and are thus invalid.

The procedure continues to step 515 and the visual construct module 210 generates a hierarchical data structure 200 utilizing the tabular data and search results. Specifically, and as described above with reference to FIG. 2, the visual construct module 210 may generate the configuration, e.g., levels, nodes, and sub-nodes, of the hierarchical data structure 200 utilizing a size of the tabular data and display characteristics. The visual construct module 210 may also store the search hit information in nodes and the sub-nodes that represent different portions of rows of the tabular data as described above with reference to FIG. 2.

The procedure continues to step 520, and the visual construct module 210 generates a level of a visual construct utilizing the hierarchical data structure 200. For example, and as described above with reference to FIG. 1A, the visual construct module 210 may generate visual construct 125A that includes a level with markers 130A-130D utilizing the hierarchical data structure 200. Specifically, the visual construct module 210 utilizes the search hit information stored in nodes 2010 through 2159 of level 1 to display markers 130A-130D at their locations and with their applied visual attributes on visual construct 125A. The markers 130A-130D visually indicate locations of the search hits and their distribution across the entirety of the tabular data.

The procedure optionally continues to step 525, and the visual construct module 210 generates one or more additional levels of the visual construct utilizing the hierarchical data structure 200. For example, marker 130A may be selected. Based on the selection of marker 130A to navigate through the tabular data, the visual construct module 210 may access the hierarchical data structure 200 and identify that node 2010 corresponds to marker 130A. Based on the identification, the visual construct module 210 may utilize the search hit information stored in sub-nodes 3010 through 3157 to generate the additional level of visual construct 125B with markers 140A-140C as depicted in FIG. 1B. Markers 140A-140C visually indicate locations of the search hits and their distribution across rows 1 through 9,154 of the tabular data that are represented by marker 130A. Therefore, based on selection of marker 130A, visual construct 125B may be generated with markers 130A-130D and markers 140A-140C to visually indicate location of the search hits and their distribution across the entirety of the tabular data and across a portion of the tabular data of interest, e.g., rows 1 through 9,154 that are represented by marker 130A. In an implementation, the visual construct module 210 may automatically adjust the viewport 105 to display the rows of the tabular data that correspond to the selected marker. In this example, the visual construct module 210 may automatically adjust viewport 105 to display 15 rows of the tabular data that are represented by marker 130A.

Based on the selection of marker 140C to further navigate through the data, the visual construct module 210 may access the hierarchical data structure 200 and identify that sub-node (not shown) of level 301 that corresponds to marker 140C. Based on the identification, the visual construct module 210 may access the 1×62 array (e.g., 0s and 1s) for the individual rows that are referenced by the sub-node. The visual construct module 210 may utilize the values of the array to generate the level, e.g., right column, of visual construct 125D of FIG. 1G with markers 145A-145D. Markers 145A-145D provide a visual indication regarding the search hits and their distribution for the individual rows of the tabular data that are represented by marker 140C. Again, the visual construct module 210 may automatically adjust viewport 105 to display 15 rows of the tabular data that are represented by marker 140C.

Therefore, based on the selection of marker 140C, visual construct 125D may be generated with markers 130A-130D, markers 140A-140C, and markers 145A-145D. Markers 130A-130D visually indicate locations of the search hits and their distribution across the entirety of the tabular data, while markers 140A-140C visually indicate locations of the search hits and their distribution across a portion of interest of the tabular data, e.g., rows 1 through 9,154 that are represented by marker 130A that is selected. Further, markers 145A-145D visually indicate locations of the search hits and their distribution across the individual rows that are represented by marker 140C.

In an implementation, the visual construct module 210 may highlight one or more markers on visual construct 125D based on the manipulation of the data in viewport 105. Specifically, and as described above, a user may manipulate viewport 105 to display 15 rows of the tabular data that are of interest to the user. Based on the manipulation of viewport 105, the visual construct module 210 may determine that the rows displayed in the viewport 105 are within a range of rows of the tabular data that are represented by one or more markers on the visual construct 125D. Based on this determination, the visual construct 210 may highlight the particular markers on the visual construct 125D. The procedure ends at 530.

Exemplary application 232 suitable for use with the present disclosure include, but are not limited to, the MATLAB® application and the Simulink® simulation application both from The Math Works, Inc. of Natick, MA, as well as Microsoft Word, Microsoft Excel, and Visual Studio® from Microsoft Corp of Redwood CA, Python from the Python Software Foundation of Wilmington, Delaware, Julia from Julia Computing, Inc. of Cambridge, Massachusetts, GNU Octave scientific programming language.

Figure 6:
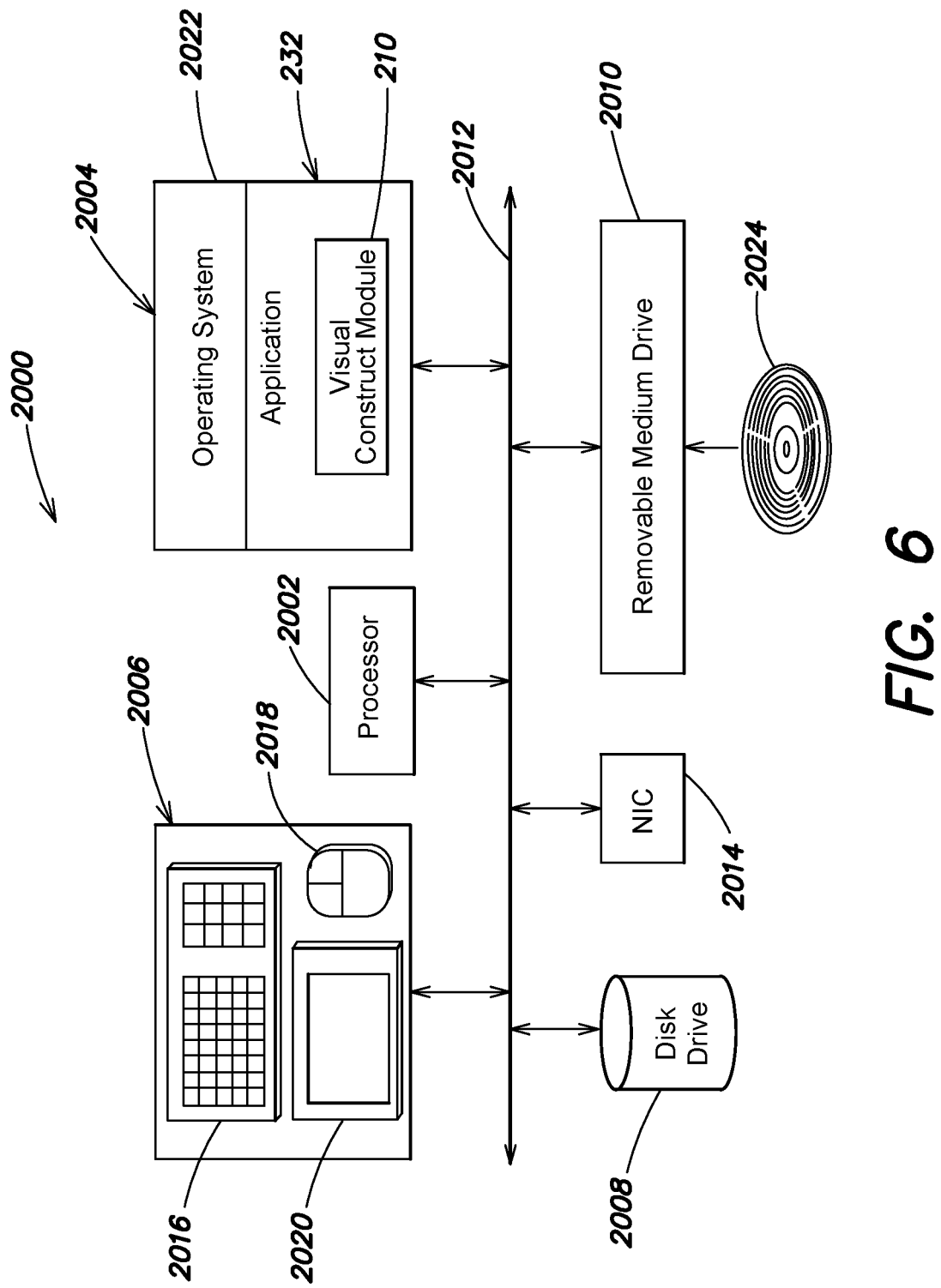
FIG. 6 is a schematic illustration of a computer or data processing system for implementing one or more embodiments described herein.

FIG. 6 is a schematic illustration of a computer or data processing system 2000 for implementing one or more embodiments described herein. The computer system 2000 may include one or more processing elements, such as a processor 2002, a main memory 2004, user input/output (I/O) 2006, a persistent data storage unit, such as a disk drive 2008, and a removable medium drive 2010 that are interconnected by a system bus 2012. The computer system 2000 may also include a communication unit, such as a network interface card (NIC) 2014. The user I/O 2006 may include a keyboard 2016, a pointing device, such as a mouse 2018, and a display 2020. Other user I/O 2006 components include voice, audio, or speech command and output systems, other pointing devices include touchpads and touchscreens, and other output devices besides a display, include a printer, a projector, a touchscreen, etc. Exemplary processing elements include single or multi-core Central Processing Units (CPUs), Graphics Processing Units (GPUs), Field Programmable Gate Arrays (FPGAs), Application Specific Integrated Circuits (ASICs), microprocessors, microcontrollers, etc. In an implementation, the data processing system 2000 may be a quantum computing system.

The main memory 2004, which may be a Random Access Memory (RAM), may store a plurality of modules, such as an operating system 2022, and one or more application programs that interface to the operating system 2022, such as the application 232. One or more objects or data structures may also be stored in the main memory 2004, such as programs, the tabular data, hierarchical data structure 200, among other data structures. In an implementation, an automatic memory management (AMM) technique may be implemented to manage the allocation and deallocation of main memory 2004 that, for example, may store the tabular data.

The removable medium drive 2010 may accept and read one or more computer readable media 2024, such as a CD, DVD, floppy disk, solid state drive, tape, flash memory or other media. The removable medium drive 2010 may also write to the one or more computer readable media 2024.

Suitable computer systems include personal computers (PCs), workstations, servers, laptops, tablets, palm computers, smart phones, electronic readers, and other portable computing devices, etc. Nonetheless, those skilled in the art will understand that the computer system 2000 of FIG. 6 is intended for illustrative purposes only, and that the present disclosure may be used with other computer systems, data processing systems, or computational devices. The present disclosure may also be used in a networked, e.g., client-server, computer architecture, or a public and/or private cloud computing arrangement. For example, the application 232 may be hosted on a server, and accessed by a remote client through an application hosting system, such as the Remote Desktop Connection tool from Microsoft Corp.

Suitable operating systems 2022 include the Windows series of operating systems from Microsoft Corp. of Redmond, WA, the Android and Chrome OS operating systems from Google Inc. of Mountain View, CA, the Linux operating system, the MAC OS® series of operating systems from Apple Inc. of Cupertino, CA, and the UNIX® series of operating systems, among others. The operating system 2022 may provide services or functions for other modules, such as allocating memory, organizing data according to a file system, prioritizing requests, etc. The operating system 2022 may run on a virtual machine, which may be provided by the data processing system 2000.

As indicated above, a user or developer, such as an engineer, scientist, programmer, etc., may utilize one or more input devices, such as the keyboard 2016, the mouse 2018, and the display 2020 to operate the application 232, and generate and/or utilize tabular data.

Figure 7:
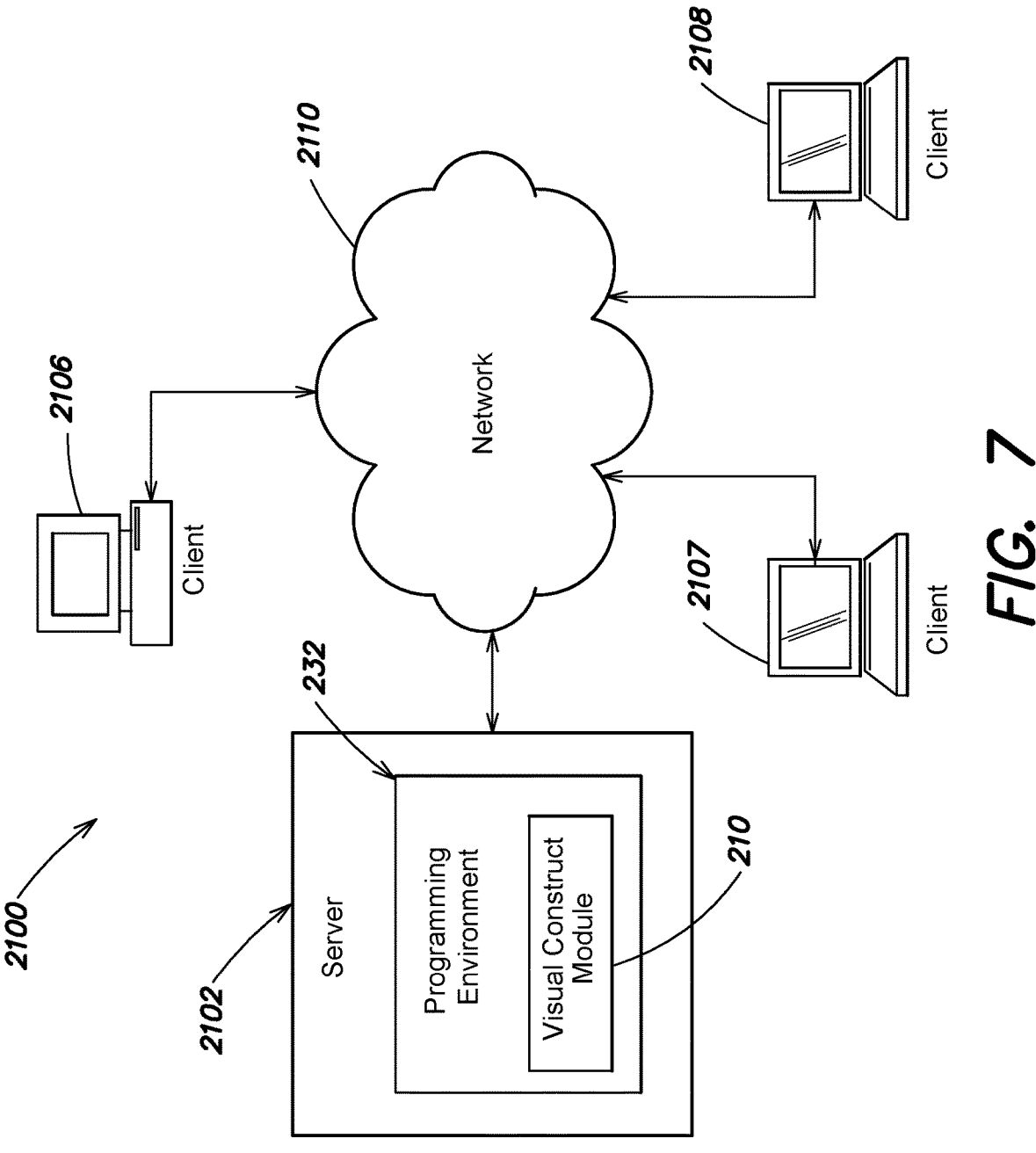
FIG. 7 is a schematic diagram of a distributed computing environment in which systems and/or methods described herein may be implemented.

FIG. 7 is a schematic diagram of a distributed computing environment 2100 in which systems and/or methods described herein may be implemented. The environment 2100 may include client and server devices, such as server 2102, and three clients 2106-2108, interconnected by one or more networks, such as network 2110. The devices of the environment 2100 may be interconnected via wired connections, wireless connections, or a combination of wired and wireless connections. The server 2102 may include one or more devices capable of receiving, generating, storing, processing, executing, and/or providing information. For example, the server 2102 may include a computing device, such as a server, a desktop computer, a laptop computer, a tablet computer, a handheld computer, or a similar device.

The clients 2106-2108 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 2106-2108 may download data and/or code from the server 2102 via the network 2110. In some implementations, the clients 2106-2108 may be desktop computers, workstations, laptop computers, tablet computers, handheld computers, mobile phones (e.g., smart phones, radiotelephones, etc.), electronic readers, or similar devices. In some implementations, the clients 2106-2108 may receive information from and/or transmit information to the server 2102.

The network 2110 may include one or more wired and/or wireless networks. For example, the network 2110 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The server 2102 may host applications or processes accessible by the clients 2106-2108. For example, the server 2102 may include the application 232, which may include or have access to the visual construct module 210.

The number of devices and/or networks shown in FIG. 7 is provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, one or more of the devices of the distributed computing environment 2100 may perform one or more functions described as being performed by another one or more devices of the environment 2100.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagram, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system (e.g., system 100) or a human user of a computer or data processing system, unless otherwise stated.

Moreover, although the examples as described herein may refer to identifying invalid temperature readings for a single sensor, it is expressly contemplated that the one or more embodiments described herein may be utilized with temperature readings across a plurality of temperature sensors, such as, different types of temperature sensors. For example, suspected invalid entries from temperatures sensors that have spiked may be compared with entries from humidity sensors. If the suspected invalid temperature entries are consistent with the entries from a humidity sensor that have also spiked, the visual construct module 210 may determine that the consistency across the two types of sensors indicates that the suspected invalid temperatures entries are in fact valid. Accordingly, it is expressly contemplated that the one or more embodiments as described herein may be utilized in a variety of different environments and for a variety of different purposes, and the examples as described here are for illustrative purposes only.

Further, certain embodiments described herein may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 2000. The computer-executable instructions may include instructions that implement one or more embodiments described herein. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages.

What is claimed is:

1. One or more non-transitory computer-readable media, having stored thereon instructions that when executed by a computing device, cause the computing device to perform operations comprising:

determining a dimension of a viewport on a computer display, wherein data is displayed in the viewport and referenced utilizing data indicators;

identifying one or more entries of the data that match a search, wherein each of the one or more entries has a corresponding data indicator;

determining a number of predetermined graphical markers that fits within the dimension of the viewport;

generating a visual construct to be displayed in the viewport opened on the computer display, wherein the visual construct includes a plurality of graphical markers and each of the plurality of graphical markers represents a different portion of the data indicators, wherein the visual construct is generated when a number of the data indicators is greater than the number of predetermined graphical markers; and displaying, in the viewport opened on the computer display, the visual construct with the plurality of graphical markers, wherein each graphical marker, that represents a particular different portion of the data indicators that includes at least one of the corresponding data indicators, is applied one or more first visual attributes that is based on a number of the at least one of the corresponding data indicators included in the particular different portion of the data indicators.

2. The one or more non-transitory computer-readable media of claim 1, the instructions cause the computing device to perform operations further comprising:

receiving a selection of a selected graphical marker displayed with the one or more first visual attributes, wherein the selected graphical marker represents a first portion of the data indicators;

generating a plurality of additional graphical markers and each of the plurality of additional graphical markers represents a different data indicator of the first portion of the data indicators, wherein the plurality of additional graphical markers are generated when a number of the first portion is less than or equal to the number of predetermined graphical markers; and displaying, in the viewport opened on the computer display, the visual construct including the plurality of graphical markers and the plurality of additional graphical markers, wherein each particular additional graphical marker, that represents a particular data indicator that is a particular corresponding data indicator, is displayed with one or more second visual attributes.

3. The one or more non-transitory computer-readable media of claim 2, wherein the one or more first visual attributes are the same as the one or more second visual attributes, and the one or more first visual attributes and the one or more second visual attributes are one or more of (1) opacity of one or more graphics, or (2) a size of the one or more graphics.

4. The one or more non-transitory computer-readable media of claim 1, the instructions cause the computing device to perform operations further comprising:

receiving a selection of a selected graphical marker displayed with the one or more first visual attributes, the selected graphical marker representing a first portion of the data indicators; and generating a plurality of additional graphical markers and each of the plurality of additional graphical markers represents a different subset of the first portion of the data indicators, wherein the plurality of additional graphical markers are generated when a number of the first portion is greater than the predetermined number of graphical markers, wherein each additional graphical marker, representing a particular subset of the first portion, is applied one or more second visual attributes that is based on a number of the corresponding data indicators included in the particular subset.

5. The one or more non-transitory computer-readable media of claim 1, the instructions cause the computing device to perform operations further comprising:

receiving a selection of a selected graphical marker displayed with the one or more first visual attributes, the selected graphical marker representing a first portion of the data indicators;

generating a plurality of first additional graphical markers and each of the plurality of first additional graphical markers represents a different subset of the first portion of the data indicators, wherein the plurality of first additional graphical markers are generated when a number of the first portion is greater than the predetermined number of graphical markers;

receiving a selection of a selected first additional graphical marker that represents a particular subset of the first portion of the data indicators;

generating a plurality of second additional graphical markers and each of the plurality of second additional graphical markers represents a different data indicator of the particular subset, wherein the plurality of second addition graphical markers are generated when a number of the particular subset is less than or equal to the predetermined number of graphical markers; and displaying, in the viewport opened on the computer display, the visual construct including the plurality of graphical markers, the plurality of first additional graphical markers, and the plurality of second additional graphical markers, wherein each particular second additional graphical marker, representing a particular data indicator that is a particular corresponding data indicator, is displayed with one or more second visual attributes.

6. The one or more non-transitory computer-readable media of claim 5, wherein the one or more first visual attributes are the same as the one or more second visual attributes, and the one or more first visual attributes and the one or more second visual attributes are one or more of (1) opacity of one or more graphics, or (2) a size of the one or more graphics.

7. The one or more non-transitory computer-readable media of claim 1, the instructions cause the computing device to perform operations further comprising:

generating a hierarchical structure containing a plurality of levels, wherein the generating comprises:

generating a first level of the hierarchical structure that includes a plurality of first nodes and each first node corresponds to a different graphical marker of the plurality of graphical markers of the visual construct, generating a second level of the hierarchical structure, wherein the second level includes a plurality of second nodes and each of the second nodes (1) references a particular first node that represents a first portion of the data indicators, and (2) represents a subset of the first portion of the data indicators, wherein the second level is generated when a number of the first portion is greater than the number of predetermined graphical markers, and generating a third level of the hierarchical structure that references each data indicator of the subset, wherein the third level of the hierarchical structure is generated when a number of the subset is less than or equal to the number of predetermined graphical markers.

8. The one or more non-transitory computer-readable media of claim 1, wherein the data is tabular data, the dimension is pixels in height or pixels in width, and the data indicators are one of row indicators of the tabular data, line indicators of the tabular data, or column indicators of the tabular data.

9. The one or more non-transitory computer-readable media of claim 1, where the data is tabular data that includes a plurality of rows and plurality of columns, the instructions cause the computing device to perform operations further comprising:

generating a different visual construct for each column of the plurality of columns utilizing the data indicators.

10. The one or more non-transitory computer-readable media of claim 1, where the data is tabular data that includes a plurality of columns, the instructions cause the computing device to perform operations further comprising:

generating a single visual construct for the plurality of columns, wherein each graphical marker, that represents the particular different portion of the data indicators that includes at least one of the corresponding data indicators, is applied the one or more first visual attributes based on an aggregated number of the at least one of the corresponding data indicators included, across the plurality of columns, in the particular different portion of the data indicators.

11. A method, comprising:

determining a dimension of a viewport on a computer display, wherein data is displayed in the viewport and referenced utilizing data indicators;

identifying one or more entries of the data that match a search, wherein each of the one or more entries has a corresponding data indicator;

determining a number of predetermined graphical markers that fits within the dimension of the viewport;

generating a visual construct to be displayed in the viewport opened on the computer display, wherein the visual construct includes a plurality of graphical markers and each of the plurality of graphical markers represents a different portion of the data indicators, wherein the visual construct is generated when a number of the data indicators is greater than the number of predetermined graphical markers; and displaying, in the viewport opened on the computer display, the visual construct with the plurality of graphical markers, wherein each graphical marker, that represents a particular different portion of the data indicators that includes at least one of the corresponding data indicators, is applied one or more first visual attributes that is based on a number of the at least one of the corresponding data indicators included in the particular different portion of the data indicators.

12. The method of claim 11, further comprising:

receiving a selection of a selected graphical marker displayed with the one or more first visual attributes, wherein the selected graphical marker represents a first portion of the data indicators;

generating a plurality of additional graphical markers and each of the plurality of additional graphical markers represents a different data indicator of the first portion of the data indicators, wherein the plurality of additional graphical markers are generated when a number of the first portion is less than or equal to the number of predetermined graphical markers; and displaying, in the viewport opened on the computer display, the visual construct including the plurality of graphical markers and the plurality of additional graphical markers, wherein each particular additional graphical marker, representing a particular data indicator that is a particular corresponding data indicator, is displayed with one or more second visual attributes.

13. The method of claim 12, wherein the one or more first visual attributes are the same as the one or more second visual attributes, and the one or more first visual attributes and the one or more second visual attributes are one or more of (1) opacity of one or more graphics, or (2) a size of the one or more graphics.

14. The method of claim 11, further comprising:

receiving a selection of a selected graphical marker displayed with the one or more first visual attributes, the selected graphical marker representing a first portion of the data indicators; and generating a plurality of additional graphical markers and each of the plurality of additional graphical markers represents a different subset of the first portion of the data indicators, wherein the plurality of additional graphical markers are generated when a number of the first portion is greater than the predetermined number of graphical markers, wherein each additional graphical marker, representing a particular subset of the first portion, is applied one or more second visual attributes that is based on a number of the corresponding data indicators included in the particular subset.

15. The method of claim 11, further comprising:

receiving a selection of a selected graphical marker displayed with the one or more first visual attributes, the selected graphical marker representing a first portion of the data indicators;

generating a plurality of first additional graphical markers and each of the plurality of first additional graphical markers represents a different subset of the first portion of the data indicators, wherein the plurality of first additional graphical markers are generated when a number of the first portion is greater than the predetermined number of graphical markers;

receiving a selection of a selected first additional graphical marker representing a particular subset of the first portion of the data indicators;

generating a plurality of second additional graphical markers and each of the plurality of second additional graphical markers represents a different data indicator of the particular subset, wherein the plurality of second addition graphical markers are generated when a number of the particular subset is less than or equal to the predetermined number of graphical markers; and displaying, in the viewport opened on the computer display, the visual construct including the plurality of graphical markers, the plurality of first additional graphical markers, and the plurality of second additional graphical markers, wherein each particular second additional graphical marker, representing a particular data indicator that is a particular corresponding data indicator, is displayed with one or more second visual attributes.

16. The method of claim 15, wherein the one or more first visual attributes are the same as the one or more second visual attributes, and the one or more first visual attributes and the one or more second visual attributes are one or more of (1) opacity of one or more graphics, or (2) a size of the one or more graphics.

17. The method of claim 11, further comprising:

generating a hierarchical structure containing a plurality of levels, wherein the generating comprises:

generating a first level of the hierarchical structure that includes a plurality of first nodes and each first node corresponds to a different graphical marker of the plurality of graphical markers of the visual construct, generating a second level of the hierarchical structure, wherein the second level includes a plurality of second nodes and each of the second node (1) references a particular first node that represents a first portion of the data indicators, and (2) represents a subset of the first portion of the data indicators, wherein the second levels is generated when a number of the first portion is greater than the number of predetermined graphical markers, and generating a third level of the hierarchical structure that references each data indicator of the subset, wherein the third level of the hierarchical structure is generated when a number of the subset is less than or equal to the number of predetermined graphical markers.

18. A system, comprising:

a processor coupled to a memory, the processor configured to:

determine a dimension of a viewport on a computer display, wherein data is displayed in the viewport and referenced utilizing data indicators;

identify one or more entries of the data that match a search, wherein each of the one or more entries has a corresponding data indicator;

determine a number of predetermined graphical markers that fits within the dimension of the viewport;

generate a visual construct to be displayed in the viewport opened on the computer display, wherein the visual construct includes a plurality of graphical markers and each of the plurality of graphical markers represents a different portion of the data indicators, wherein the visual construct is generated when a number of the data indicators is greater than the number of predetermined graphical markers; and display, in the viewport opened on the computer display, the visual construct with the plurality of graphical markers, wherein each graphical marker, that represents a particular different portion of the data indicators that includes at least one of the corresponding data indicators, is applied one or more first visual attributes that is based on a number of the at least one of the corresponding data indicators included in the particular different portion of the data indicators.

19. The system of claim 18, the processor further configured to:

receive a selection of a selected graphical marker displayed with the one or more first visual attributes, wherein the selected graphical marker represents a first portion of the data indicators;

generate a plurality of additional graphical markers and each of the plurality of additional graphical markers represents a different data indicator of the first portion of the data indicators, wherein the plurality of additional graphical markers are generated when a number of the first portion is less than or equal to the number of predetermined graphical markers; and display, in the viewport opened on the computer display, the visual construct including the plurality of graphical markers and the plurality of additional graphical markers, wherein each particular additional graphical marker, representing a particular data indicator that is a particular corresponding data indicator, is displayed with one or more second visual attributes.

20. The system of claim 19, wherein the one or more first visual attributes are the same as the one or more second visual attributes, and the one or more first visual attributes and the one or more second visual attributes are one or more of (1) opacity of one or more graphics, or (2) a size of the one or more graphics.

21. The system of claim 18, the processor further configured to:

receive a selection of a selected graphical marker displayed with the one or more first visual attributes, the selected graphical marker representing a first portion of the data indicators; and generate a plurality of additional graphical markers and each of the plurality of additional graphical markers represents a different subset of the first portion of the data indicators, wherein the plurality of additional graphical markers are generated when a number of the first portion is greater than the predetermined number of graphical markers, wherein each additional graphical marker, representing a particular subset of the first portion, is applied one or more second visual attributes that is based on a number of the corresponding data indicators included in the particular subset.

22. The system of claim 18, the processor further configured to:

receive a selection of a selected graphical marker displayed with the one or more first visual attributes, the selected graphical marker representing a first portion of the data indicators;

generate a plurality of first additional graphical markers and each of the plurality of first additional graphical markers represents a different subset of the first portion of the data indicators, wherein the plurality of first additional graphical markers are generated when a number of the first portion is greater than the predetermined number of graphical markers;

receive a selection of a selected first additional graphical marker that represents a particular subset of the first portion of the data indicators;

generate a plurality of second additional graphical markers and each of the plurality of second additional graphical markers representing a different data indicator of the particular subset, wherein the plurality of second addition graphical markers are generated when a number of the particular subset is less than or equal to the predetermined number of graphical markers; and display, in the viewport opened on the computer display, the visual construct including the plurality of graphical markers, the plurality of first additional graphical markers, and the plurality of second additional graphical markers, wherein each particular second additional graphical marker, representing a particular data indicator that is a particular corresponding data indicator, is displayed with one or more second visual attributes.

23. The system of claim 21, wherein the one or more first visual attributes are the same as the one or more second visual attributes, and the one or more first visual attributes and the one or more second visual attributes are one or more of (1) opacity of one or graphics, or (2) a size of the one or more graphics.

* * * * *